(12) United States Patent
Okura et al.

(10) Patent No.: US 6,226,638 B1
(45) Date of Patent: May 1, 2001

(54) INFORMATION SEARCHING APPARATUS FOR DISPLAYING AN EXPANSION HISTORY AND ITS METHOD

(75) Inventors: Seiji Okura; Masaru Fuji; Akira Ushioda, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,964

(22) Filed: Sep. 3, 1998

(30) Foreign Application Priority Data

Mar. 18, 1998 (JP) .................................................. 10-069050

(51) Int. Cl.[7] ...................................................... G06F 17/30
(52) U.S. Cl. ........................ 707/5; 707/4; 707/3; 707/2; 704/9
(58) Field of Search .................... 707/1, 5, 10, 100–104, 707/200–206, 532, 533–536; 704/3, 9; 700/95, 145, 182

(56) References Cited

U.S. PATENT DOCUMENTS

| | | | |
|---|---|---|---|
| 5,278,980 | * | 1/1994 | Pedersen et al. .......................... 707/4 |
| 5,619,709 | * | 4/1997 | Caid et al. ............................ 707/532 |
| 5,673,428 | * | 9/1997 | Hirakawa ................................. 707/5 |
| 5,715,468 | * | 2/1998 | Budzinski ............................... 704/9 |
| 5,787,423 | * | 7/1998 | Hirakawa ................................. 707/5 |
| 5,794,178 | * | 8/1998 | Caid et al. .............................. 704/9 |
| 5,799,268 | * | 8/1998 | Boguraev ............................... 704/9 |
| 5,828,575 | * | 10/1998 | Sakai ................................... 700/182 |
| 5,963,941 | * | 10/1999 | Hirakawa ................................. 707/5 |
| 5,971,589 | * | 8/1998 | Hazama et al. ....................... 700/145 |
| 6,092,035 | * | 7/2000 | Kurachi et al. .......................... 704/3 |

* cited by examiner

Primary Examiner—Ruay Lian Ho
(74) Attorney, Agent, or Firm—Staas & Halsey LLP

(57) ABSTRACT

An information searching apparatus converts an input key-term into key-terms for searching the database by at least two times of expansions using a related-term dictionary and a translation dictionary, and stores the history of the expansions in the form of a tree structure. Then, a part or the whole of the thus-stored tree structure is displayed on a screen. A searcher designates appropriate terms among the thus-displayed information as key-terms for searching.

20 Claims, 44 Drawing Sheets

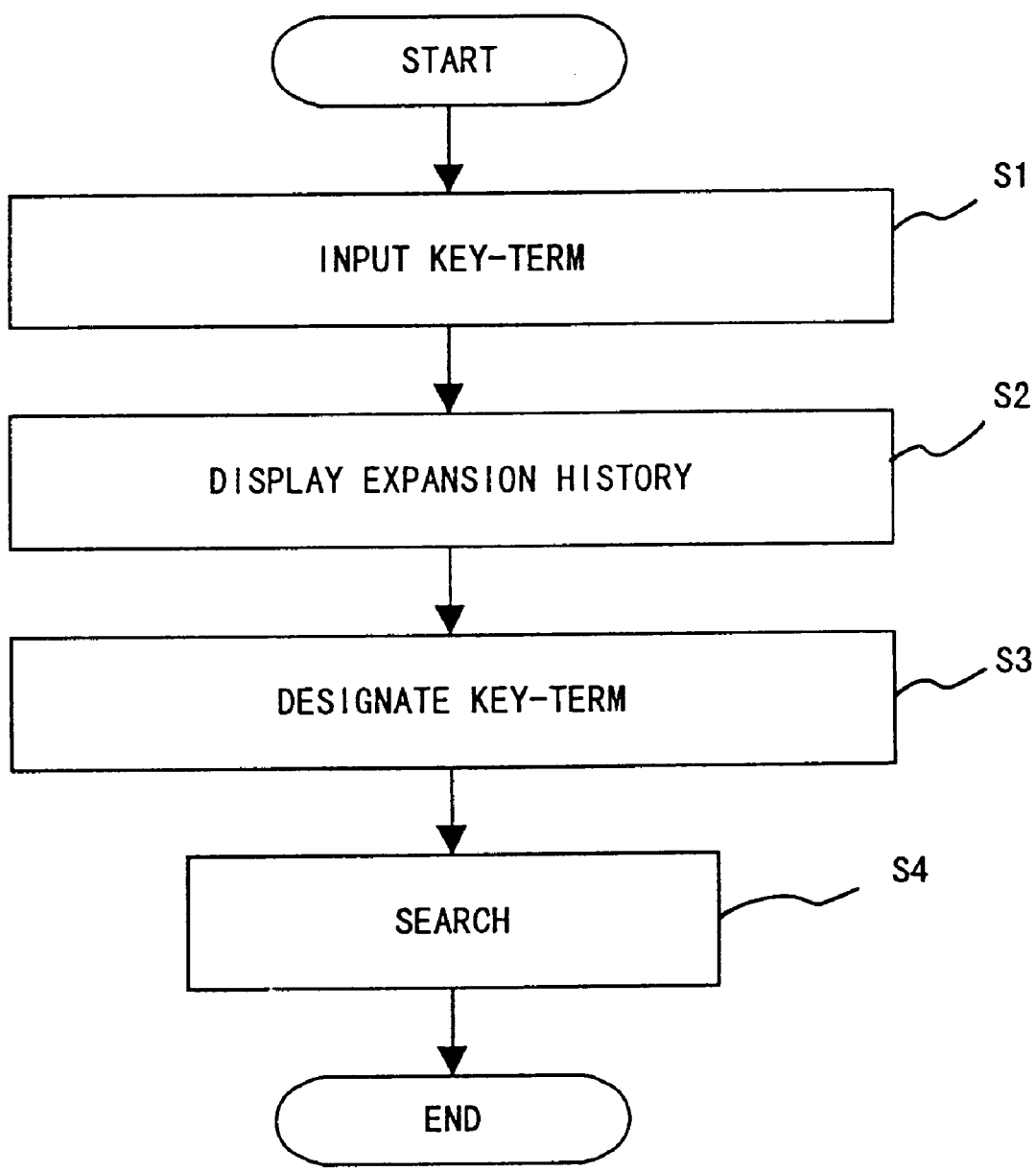
F I G. 3

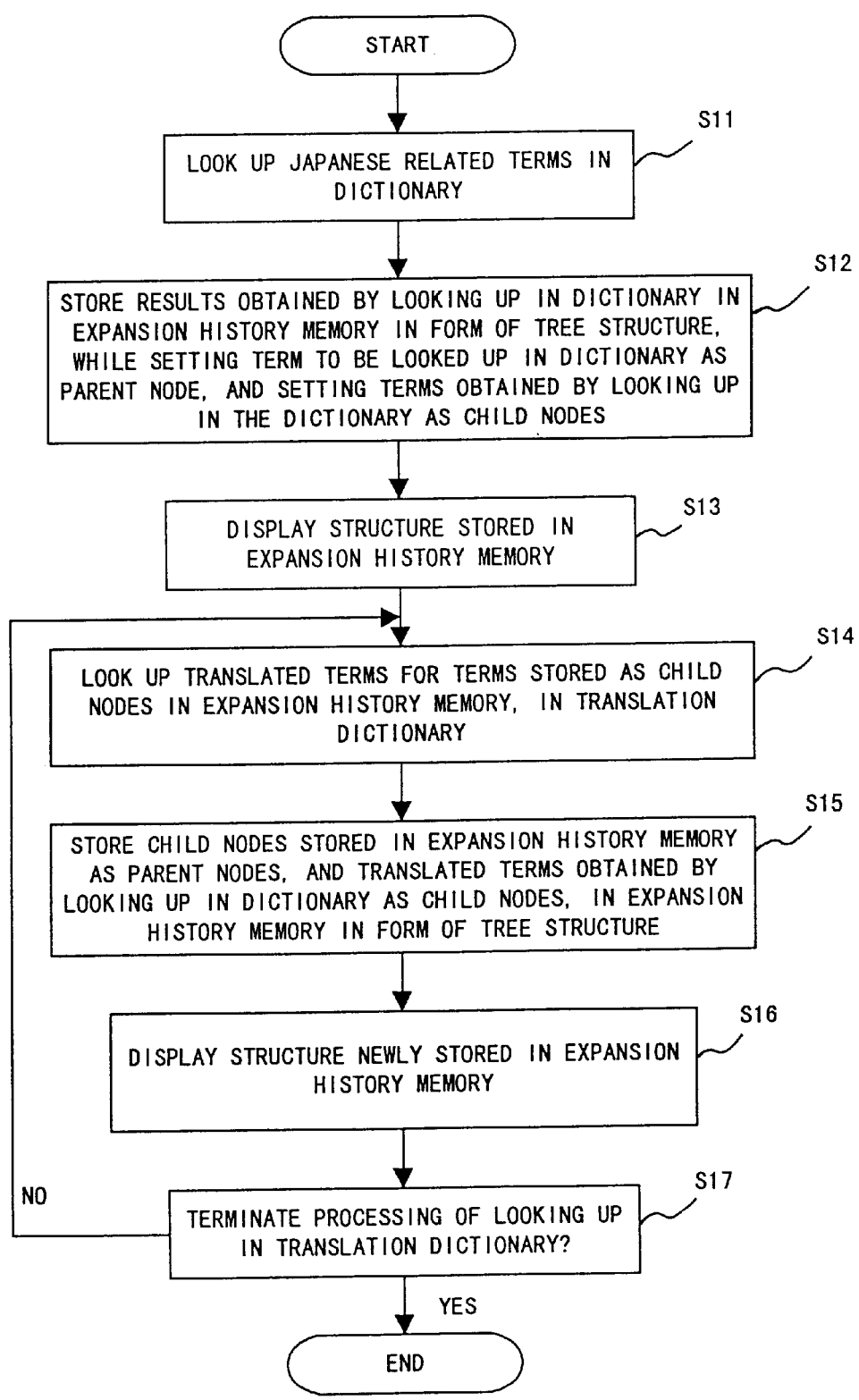
F I G. 4

| スポーツ | |
|---|---|
| 野球 | |
| サッカー | |
| 水泳 | |
| 柔道 | |
| ... | |

FIG. 5

| | |
|---|---|
| スポーツ | |
| 野 球 | baseball |
| サッカー | soccer |
| 水 泳 | swimming |
| 柔 道 | judo |
| ... | ... |

FIG. 7

```
        スポーツ ‥‥
       ╱  │    │   ╲ ╲
      野球 サッカー 水泳  柔道 ‥‥
       │   │    │    │
    baseball soccer swimming judo
```

FIG. 8

```
          スポーツ ････
        ╱    │     │    ╲  ╲
      野球  サッカー [水泳] [柔道] ････
       │     │      │      │
    baseball soccer [swimming] [judo]
```

FIG 12

| | |
|---|---|
| スポーツ | |
| 野 球 | baseball |
| サッカー | soccer |
| [水 泳] | [swimming] |
| [柔 道] | [judo] |
| ... | ... |

FIG. 13

| スポーツ | | |
|---|---|---|
| 野 球 | b a s e b a l l | |
| サッカー | s o c c e r | |
| 水 泳 | s w i m m i n g | |
| 柔 道 | j u d o | |
| . . . | . . . | |

FIG. 16

| スポーツ | | |
|---|---|---|
| 野 球 | b a s e b a l l | |
| サッカー | s o c c e r | |
| 水 泳 | s w i m m i n g | w a t e r  p o l o |
| 柔 道 | j u d o | |
| . . . | . . . | |

baseball  soccer  swimming  judo

FIG. 18

| 哲 学 者 | EXPANDED TERM 1 | EXPANDED TERM 2 |
|---|---|---|
| philosopher | Thomas Aquinas | Thomas Hobbs |

FIG. 21

SOFTWARE : computer, application,
           installation, user, ⋯

SOFTBALL : player, ball, stadium, ⋯

PLAYER   : baseball, soccer,
           softball, piano, ⋯

⋮

F I G. 2 6

| ソフト | | |
|---|---|---|
| software | | |
| softball | | |
| soft cream | | |
| gentle | | |
| s o f t | | |

FIG. 33

| ソフト | | |
|---|---|---|
| software | | |
| [softball] | | |
| soft cream | | |
| gentle | | |
| [soft] | | |

FIG. 34

| ソフト | RELATED TERM 1 | RELATED TERM 2 |
|---|---|---|
| software | | |
| [softball] | pitcher | battery |
| soft cream | | |
| gentle | | |
| [soft] | creamy | meek |

FIG. 35

| ソフト | RELATED TERM 1 | RELATED TERM 2 |
|---|---|---|
| [softball] | pitcher | battery |
| [soft] | creamy | meek |

FIG. 36

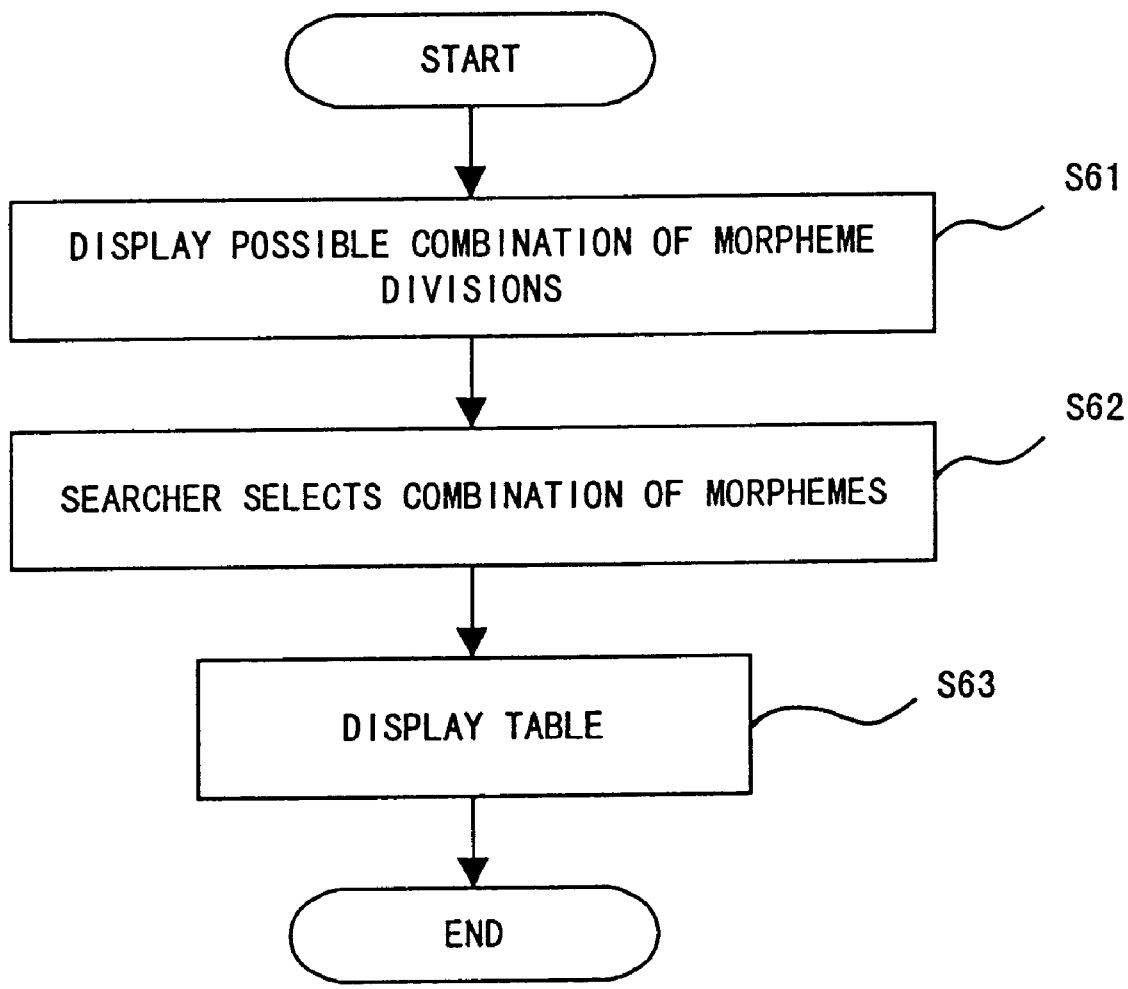
F I G. 3 7

| 自転車 | 専用 | 道路 |

| 自転車 | RELATED TERM 1 | RELATED TERM 2 |
|---|---|---|
| b i c y c l e | motorcycle | r i d e |
| b i k e | autobike | c o m b |
| w h e e l | unicycle | d r i v e |

FIG. 39

| 自転車専用道路 | RELATED TERM 1 | RELATED TERM 2 |
|---|---|---|
| bikeway | bicycle | ride |
| cycleway | bike | road |

FIG. 40

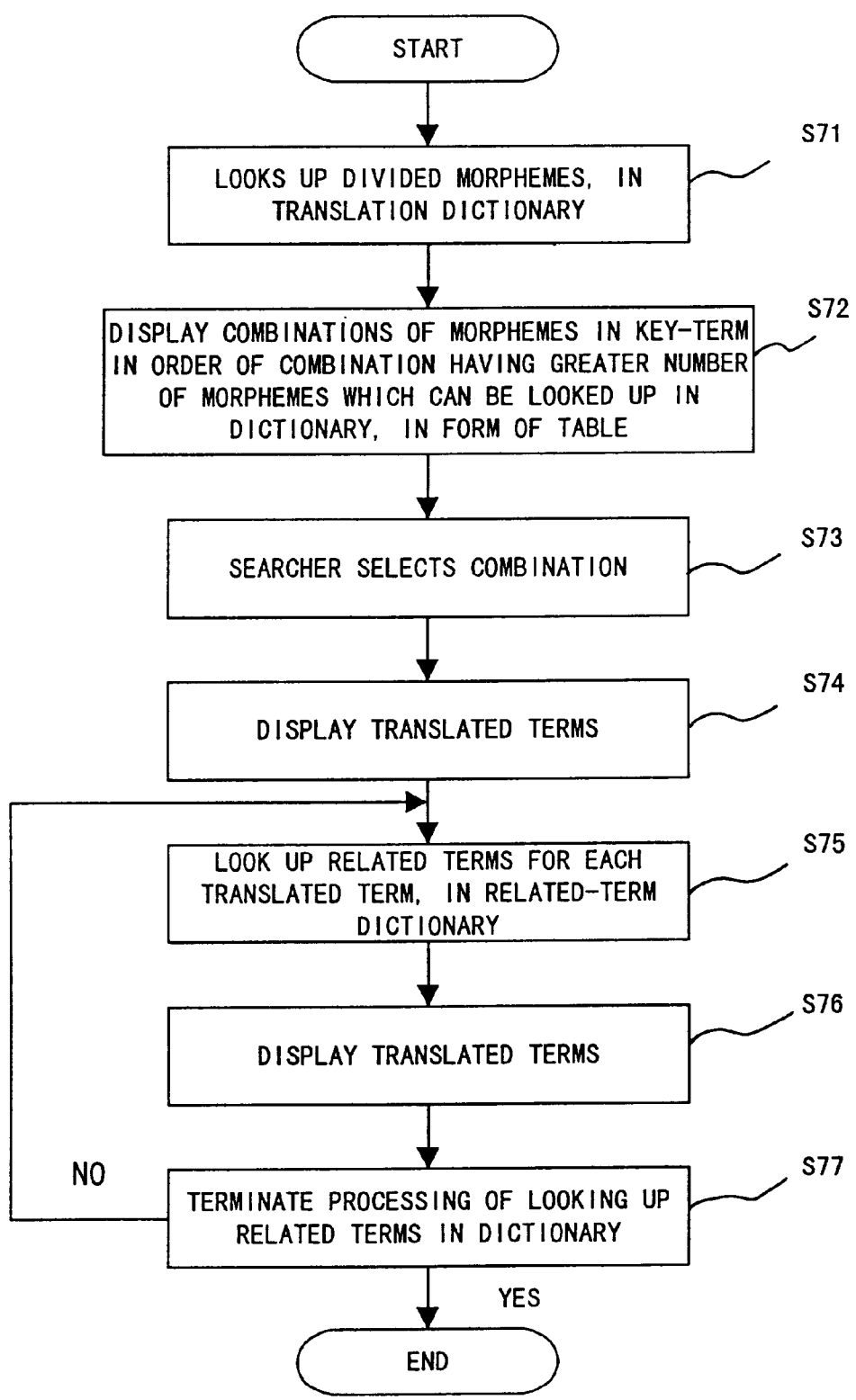
F I G. 41

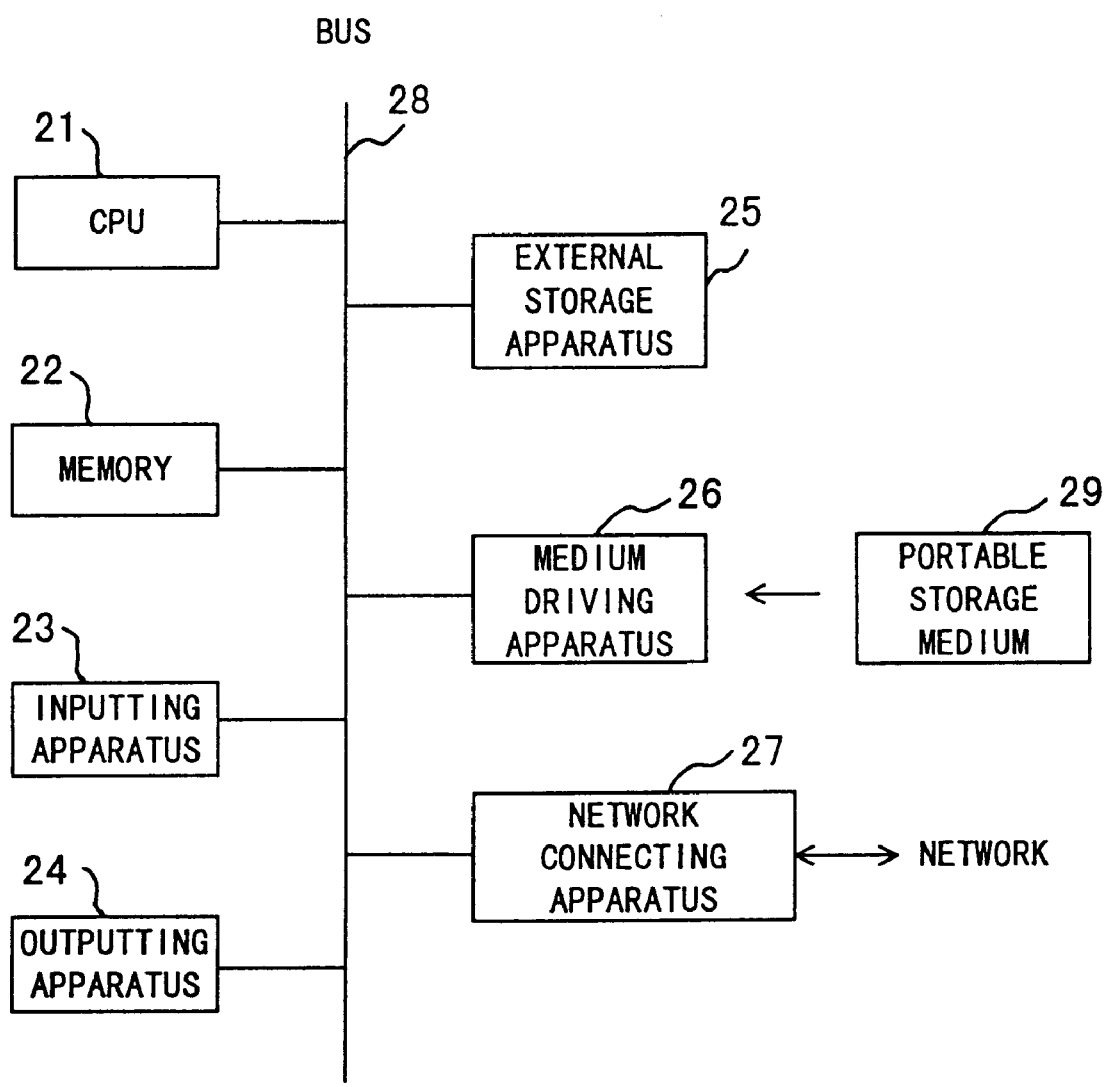
F I G. 43

INFORMATION SEARCHING APPARATUS FOR DISPLAYING AN EXPANSION HISTORY AND ITS METHOD

BACKGROUND OF THE INVENTION

1. Field of the Invention

The present invention relates to an information searching apparatus and its method including a function for providing a searcher with a searching hint, in a cross-lingual information retrieval for converting a key-term into another language and searching a database.

2. Description of the Related Art

Nowadays, with the developments in computer networks, progress has been made in searching apparatuses, and accordingly information can be obtained from computers all over the world. When a database written in a certain language is searched, it is common to search this database using the same language. However, when this database is to be searched using another language, a given key-term is simply converted into the language of this database. Here, a key-term is defined to be a word or word compound of which a query is composed. Such a searching method is called a cross-lingual information retrieval. For example, when a database written in English is to be searched using a key-term written in Japanese, this key-term is converted into English, and then a search is performed.

As a conventional information search, there is the following technology. A key-term is rewritten into related terms such as similar terms, synonyms, antonyms, a shift of indication, translated terms, abbreviated terms, and the like, the results are displayed, and a searcher selects some terms to be supplied to a search engine among the displayed ones. Here, the shift of indication means another character string having a similar form as the key-term being displayed.

In the above-mentioned conventional information search, there is the following problem.

In the above-mentioned conventional cross-lingual information retrieval, a key-term that a user inputs is converted to the language of a database, and optionally this converted key-term is expanded to its related terms in the same language. In this method, however, a searcher cannot comprehensively or fully understand the relationship between the key-term he inputs and the actual key-terms to be supplied to the search engine.

If a more suitable cross-lingual information retrieval is desired, it is necessary to simultaneously perform a conversion (translation expansion) which is a simple translation of the input key-term, and another conversion (related-term expansion) into related terms. However, if such an expansion process having at least two levels (referred to as a multi-level expansion process, hereinafter) is performed, a series of expansion processes becomes more difficult to grasp. Therefore, there might arise the possibility that unnecessary key-terms are input to the search engine or necessary key-terms are carelessly omitted.

SUMMARY OF THE INVENTION

An object of the present invention is to provide an information searching apparatus including an interface, and its method, whose expansion processes can be easily understood by a searcher, in an information search for iteratively expanding an input key-term.

The information searching apparatus of the present invention comprises an inputting unit, an expanding unit, a storing unit, an outputting unit, and a searching unit.

The inputting unit inputs the key-term, the expanding unit rewrites the key-term into information having a plurality of levels, and the storing unit stores an expansion history having the plurality of levels, in the form of a tree structure. The outputting unit outputs at least a part of the information stored in the above-mentioned tree structure, and the searching unit makes a search using the expanded key-terms selected by the searcher among the ones in the expansion history shown by the outputting unit.

The expanding unit includes, for example, a translation dictionary for translating a term from one language into another language, and a related-term dictionary for obtaining related terms in the same language, such as similar terms, synonyms, antonyms, a shift of indication, translated terms, abbreviated terms, and the like. Further, this unit expands the thus-input key-term into key-terms in the database language by combining the translation expansion process and the related-term expansion processes. The expansion history of the terms is stored in the storing unit in the form of a tree structure in which the expanded terms at each level are made to be nodes.

The outputting unit displays, for example, an expansion history of the tree structure which is stored in the storing unit, on a screen, and a user (searcher) designates the terms included in the thus-displayed expansion history as key-terms for searching. The searching unit searches a database or the like using the thus-designated key-terms for searching, and obtains the searched results.

BRIEF DESCRIPTION OF THE DRAWINGS

FIG. 3 is a flowchart of a searching processing;

FIG. 4 is a flowchart of a first displaying processing;

FIG. 5 shows a first expansion display;

FIG. 7 shows a second expansion display;

FIG. 8 is a diagram showing a third expansion display;

FIG. 12 is a diagram showing a fifth expansion display;

FIG. 13 shows a sixth expansion display;

FIG. 16 shows a ninth expansion display;

FIG. 17 shows a tenth expansion display;

FIG. 18 is a diagram showing an eleventh expansion display;

FIG. 21 shows a fourteenth expansion display;

FIG. 26 shows a co-occurrence information database;

FIG. 33 shows a twenty-second expansion display;

FIG. 34 shows selection results;

FIG. 35 shows a twenty-third expansion display;

FIG. 36 shows a twenty-fourth expansion display;

FIG. 37 is a flowchart showing a fifth expansion process;

FIG. 39 shows a twenty-fifth expansion display;

FIG. 40 shows a twenty-sixth expansion display;

FIG. 41 is a flowchart showing a sixth displaying processing;

FIG. 43 is a block diagram showing the configuration of an information processing apparatus.

DESCRIPTION OF THE PREFERRED EMBODIMENTS

The embodiments of the present invention will be explained in detail hereinafter, with reference to the drawings.

Figure 1:
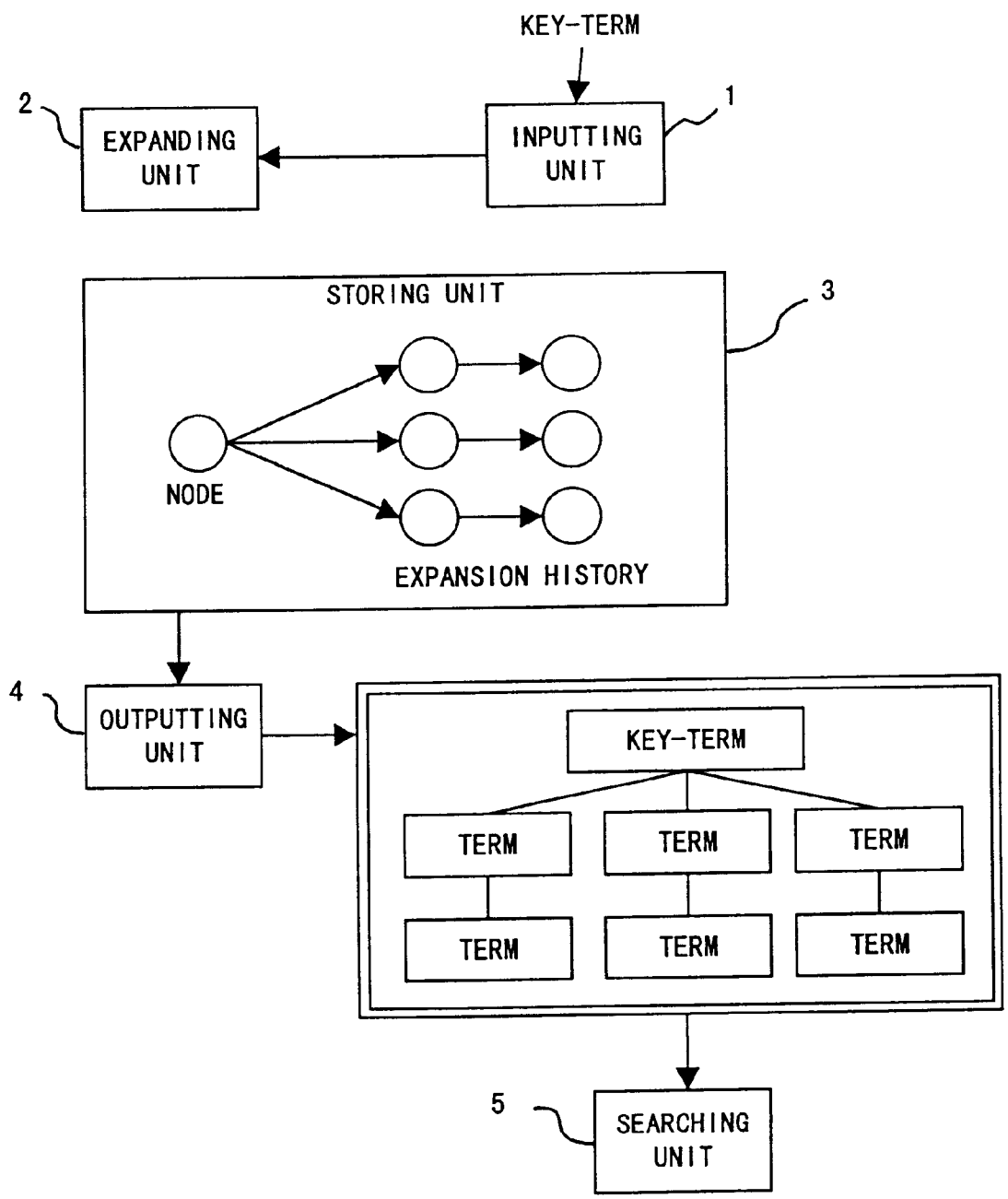
FIG. 1 is a block diagram showing the principle of an information searching apparatus according to the present invention.

FIG. 1 is a block diagram showing the principle of an information searching apparatus according to the present invention. The information searching apparatus shown in FIG. 1 comprises an inputting unit 1, an expanding unit 2, a storing unit 3, an outputting unit 4, and a searching unit 5.

The inputting unit 1 inputs a key-term, the expanding unit 2 expands this key-term into information having a history of expansions, and the storing unit 3 stores this expansion history in the form of a tree structure. The outputting unit 4 outputs at least a part of the information stored in the above-mentioned tree structure, and the searching unit 5 makes a search using the thus-output information.

The expanding unit 2 includes, for example, a translation dictionary for translating a term from one language into another language, and a related-term dictionary for obtaining related terms in the same language, such as similar terms, synonyms, antonyms, a shift of indication, translated terms, abbreviated terms, and the like. Further, this unit 2 rewrites the input key-term into a plurality of levels by combining the translation expansion process and the related-term expansion process. The expansion history of the key-term is stored in the storing unit 3 in the form of a tree structure in which expanded terms at each level are made to be nodes.

The outputting unit 4 displays on a screen, for example, the expansion history in the form of a tree structure, which is stored in the storing unit 3, and a user (searcher) designates the term included in the thus-displayed expansion history as search key-terms. The searching unit 5 searches a database or the like using the thus-designated key-terms, and obtains the searched results.

According to such an information searching apparatus, the expansion history is displayed to a searcher in the form of a tree structure, in a search such as in a cross-lingual information retrieval or the like which accompanies the iterative expansion processes of an input key-term. Therefore, the searcher can easily understand the history of the expansion processes so that he or she can properly designate search key-terms.

For example, the inputting unit 1 shown in FIG. 1 corresponds to a key-term inputting portion 12 shown in FIG. 2 which will be described later. The expanding unit 2 shown in FIG. 1 corresponds to a dictionary looking-up portion 13, and expansion dictionaries 16 and 17 shown in FIG. 2. The storing unit 3 shown in FIG. 1 corresponds to an expansion history memory 18 shown in FIG. 2. The outputting unit 4 shown in FIG. 1 corresponds to an on-screen information display edit portion 11 shown in FIG. 2. The searching unit 5 shown in FIG. 1 corresponds to a searching portion 15 shown in FIG. 2.

In the present embodiments, a key-term navigation is performed for supplying the hint for a search by clearly displaying a history of the key-term expansion processes to a searcher. In order to facilitate the key-term navigation in a cross-lingual information retrieval, necessary and effective information is interactively displayed to the searcher.

Figure 2:
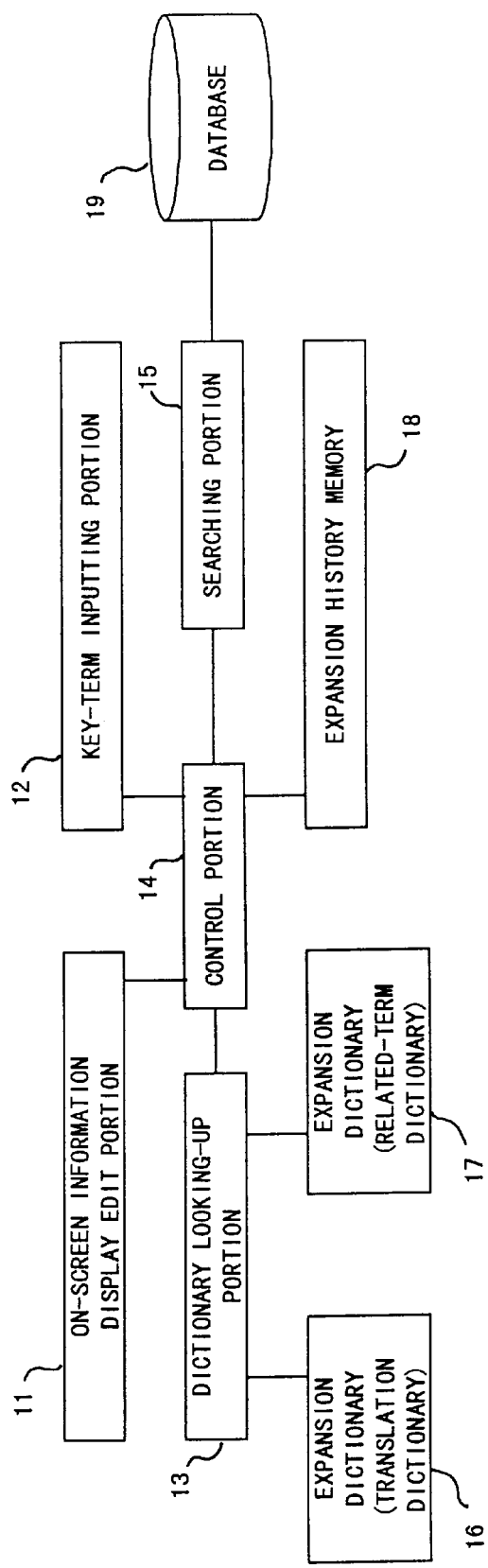
FIG. 2 is a block diagram showing the configuration of the information searching apparatus.

FIG. 2 is a block diagram showing the configuration of the information searching apparatus according to the present embodiments. The information searching apparatus shown in FIG. 2 is configured by a computer. This apparatus comprises the on-screen information display edit portion 11, the key-term inputting portion 12, the dictionary looking-up portion 13, a control portion 14, the searching portion 15, the expansion dictionaries 16 and 17, the expansion history memory 18, and a database 19.

In this apparatus, two expansion dictionaries are provided. The expansion dictionary 16 is a translation dictionary for expanding one or more key-terms to translated terms. The expansion dictionary 17 is a related-term dictionary for expanding one or more key-terms to related terms. Two or more related-term dictionaries can be provided.

When the searcher inputs a key-term through the key-term inputting portion 12, the control portion 14 outputs an expansion command to the dictionary looking-up portion 13. This dictionary looking-up portion 13 expands the key-term to translated terms as well as related terms according to this command. A history of the key-term expansion is stored in the expansion history memory 18 in the form of a tree structure.

The on-screen information display edit portion 11 displays the expansion history in various forms which will be described later, and interactively determines with the searcher an expansion history as well as search key-terms. The control portion 14 controls the operations of the whole apparatus, and supplies search key-terms designated by the searcher to the searching portion 15. This searching portion 15 searches the database 19 using the thus-supplied key-terms. The searching portion 15 corresponds to a search engine.

FIG. 3 is a flowchart of a searching process according to the information searching apparatus shown in FIG. 2. When the searcher inputs a key-term to the key-term inputting portion 12 (step S1), the on-screen information display edit portion 11 displays the expansion history on a screen (step S2). When the searcher designates appropriate search key-terms (step S3), the searching portion 15 searches the database 19 using these search key-terms (step S4), and the search process is finished.

FIG. 4 is a flowchart of a displaying processing performed in step S2 shown in FIG. 3. Here, a Japanese key-term is input, and it is desirable to obtain as much information as possible related to this key-term.

The dictionary looking-up portion 13 obtains Japanese related terms of the input key-term using the expansion dictionary 17 (step S11), and the thus-obtained related terms are stored in the expansion history memory 18 through the control portion 14 (step S12). At this time, the input key-term is designated as a parent node, and the related terms obtained by looking up in the dictionary are designated as its child nodes, and the expansion history is stored in the form of a tree structure. Then, the on-screen information display edit portion 11 displays a structure of the expansion history which is stored in the expansion history memory 18 (step S13).

Next, the dictionary looking-up portion 13 obtains translated terms for the respective related terms which are stored as child nodes in the expansion history memory 18, using the expansion dictionary 16 (step S14). The thus-obtained translated terms are stored in the expansion history memory 18 through the control portion 14 (step S15). At this time, the related terms are designated as parent nodes while translated terms obtained by looking up in the dictionary are designated as child nodes, and the expansion history is stored in the form of a tree structure. Then, the on-screen information display edit portion 11 displays the structure of this expansion history which is newly stored in the expansion history memory 18 (step S16).

Next, the control portion 14 determines whether or not all the related terms have been looked up in the translation dictionary (step S17). If any related term remains not-translated, processings in and after step S14 are repeated. When all the processings of looking up in the translation dictionary are terminated, the displaying processing is also terminated.

Figure 5:
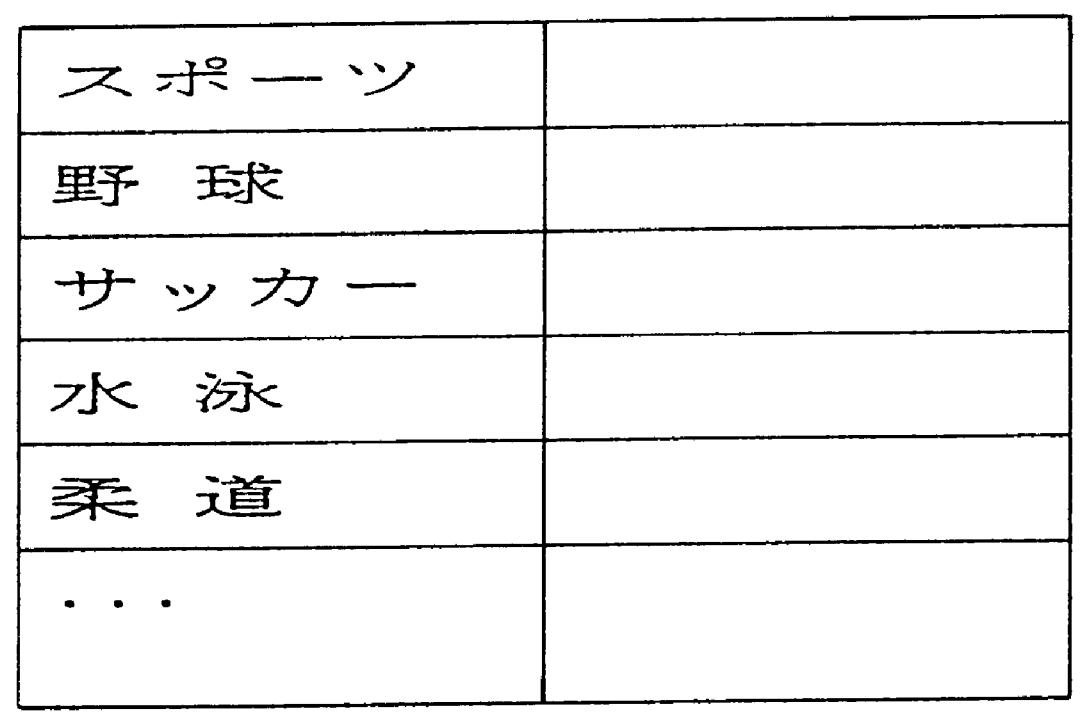

For example, if "スポーツ" is input as a key-term, "スポーツ" is looked up in a Japanese related-term dictionary, and "野球", "サッカー", "水泳", "柔道", and the like are obtained as related terms. Then, "スポーツ" is stored as a parent node, and "野球", "サッカー", "水泳", and "柔道" are stored as its child nodes, in the expansion history memory 18. Its structure is displayed as shown in FIG. 5.

Figure 6:
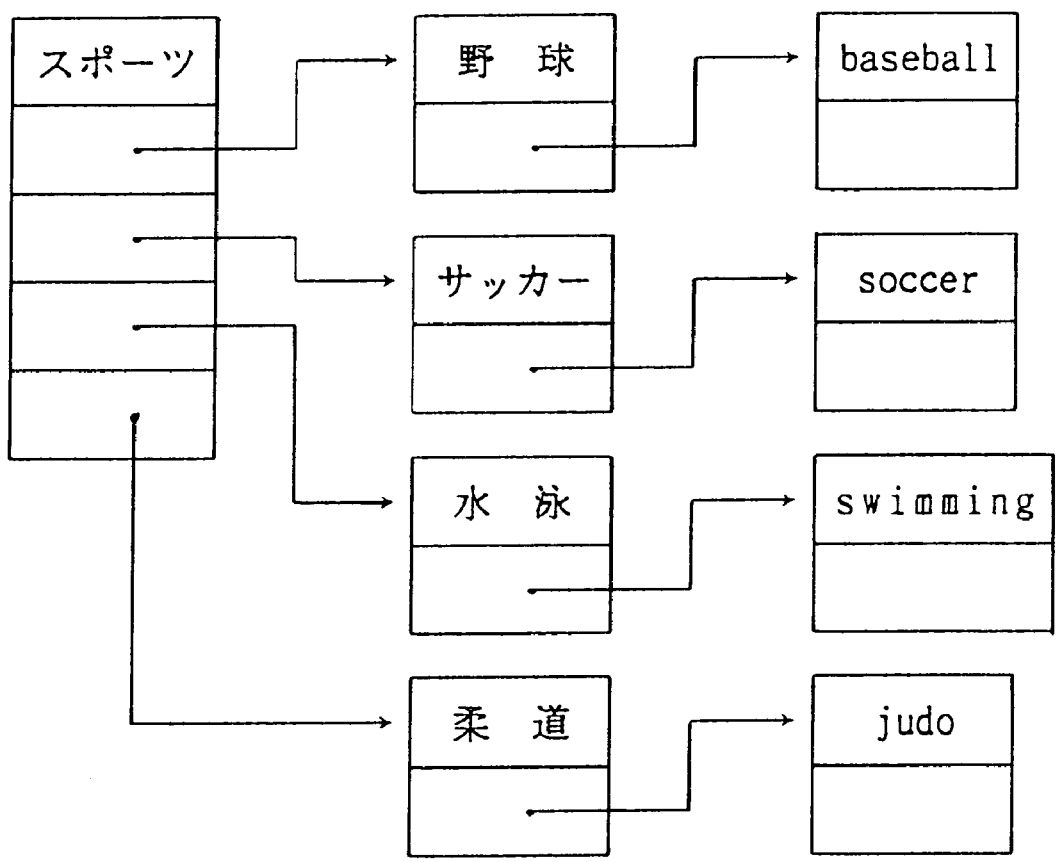
FIG. 6 is a block diagram showing a first expansion history.

Next, a Japanese-English translation dictionary is looked up. "Baseball" is obtained from "野球", "soccer" from "サッカー", "swimming" from "水泳", and "judo" from "柔道". Respective expansion processes are stored in the expansion history memory 18 in the form of a tree structure as shown in FIG. 6.

For example, in the case of "野球" and "baseball", "野球" is stored as a parent node while "baseball" is stored as a child node of "野球". A pointer (arrow) which indicates the flow from a parent node to a child node is provided. A thus-stored tree structure designating "スポーツ" as a root (root node) is displayed as shown in FIG. 7. This expansion history can also be displayed in the form of a tree structure as shown in FIG. 8.

Figure 9:
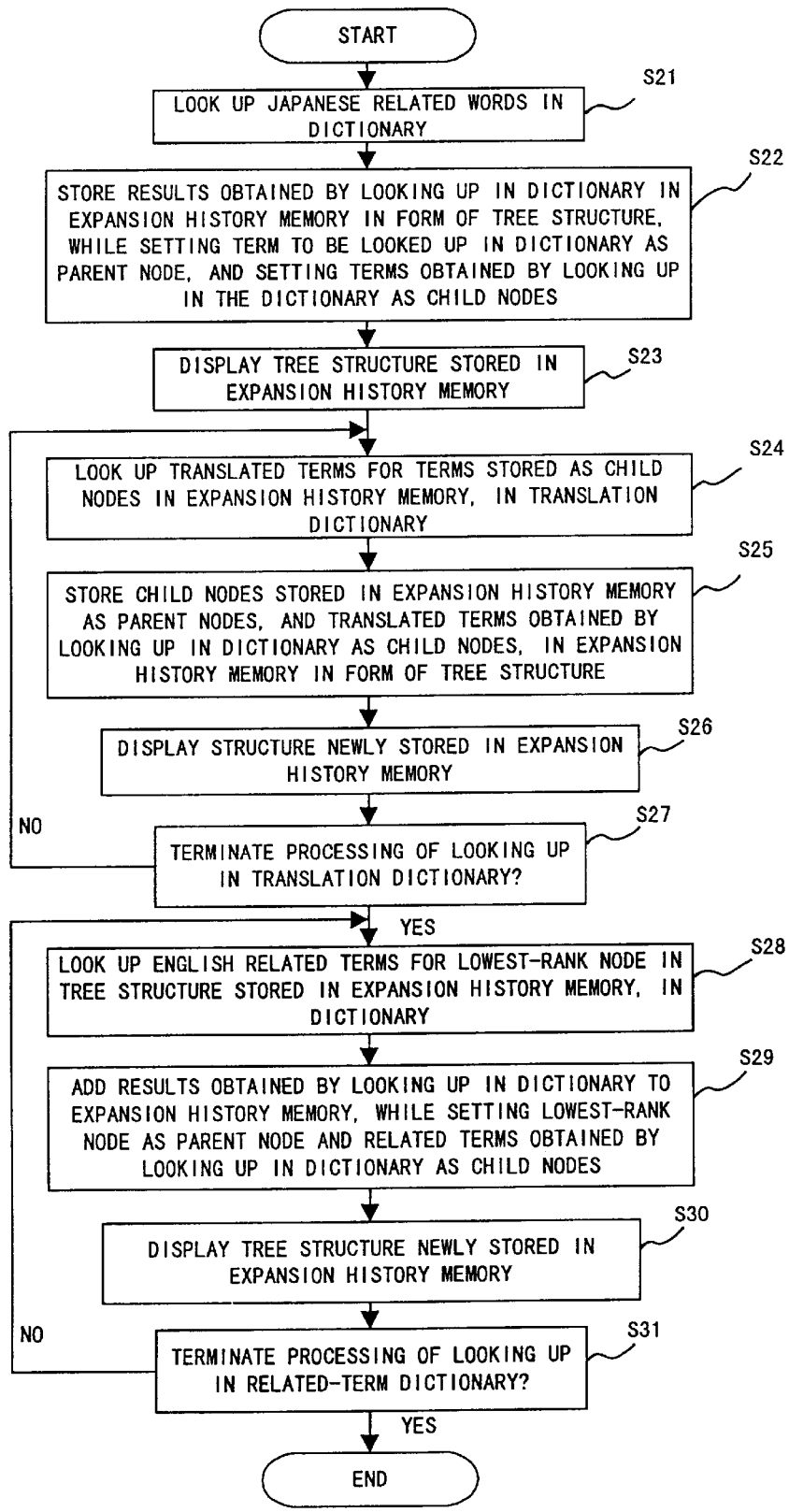
FIG. 9 is a flowchart showing a second displaying processing.

In the displaying processing shown in FIG. 4, an expansion process is performed in two levels such as a related-term expansion process and a translation expansion process. In the case of an expansion process performed in more than two levels, the displaying processing is the same. FIG. 9 shows a flowchart of a displaying processing based on an expansion process performed in three levels. In FIG. 9, the processings which are performed in steps S21, S22, S23, S24, S25, S26, and S27 are the same as those which are performed in steps S11, S12, S13, S14, S15, S16, and S17 as shown in FIG. 4.

In step S27, when all the processings of looking up in the translation dictionary are terminated, the dictionary looking-up portion 13 obtains, using the expansion dictionary 17, English related terms for the translated term which corresponds to the lowest rank node in the tree structure stored in the expansion history memory 18 (step S28). The thus-obtained English related terms are stored in the expansion history memory 18 through the control portion 14 (step S29). At this time, the translated term is designated as a parent node, while the related terms obtained by looking up in the dictionary are designated as child nodes. This expansion history is added in the form of a tree structure. Then, the on-screen information display edit portion 11 displays the structure of the expansion history which is newly stored in the expansion history memory 18 (step S30).

Next, the control portion 14 determines whether or not the processings of looking up in the related-term dictionary are terminated for all the translated terms (step S31). If any term remains not-looked up in the dictionary, processings in and after step S28 are repeated. When all the processings of looking up in the related-term dictionary are terminated, the displaying processings are also terminated.

For example, when "世界" is input as a key-term, "世界" is first looked up in the Japanese related-term dictionary, and "地球", "国際化", and "旅行" are obtained as the related terms. "世界" is stored as a parent node, and "地球", "国際化", and "旅行" are stored as its child nodes in the expansion history memory 18.

Then, the Japanese-English translation dictionary is looked up, and "地球", "国際化", and "旅行" are respectively expanded. By doing so, "earth" is obtained from "地球", "internationalization" is obtained from "国際化", and "travel" and "tour" are obtained from "旅行". Japanese terms used in these expansion processes are stored as parent nodes, and terms which are translated from Japanese into English are stored as child nodes, in the expansion history memory 18.

Figure 10:
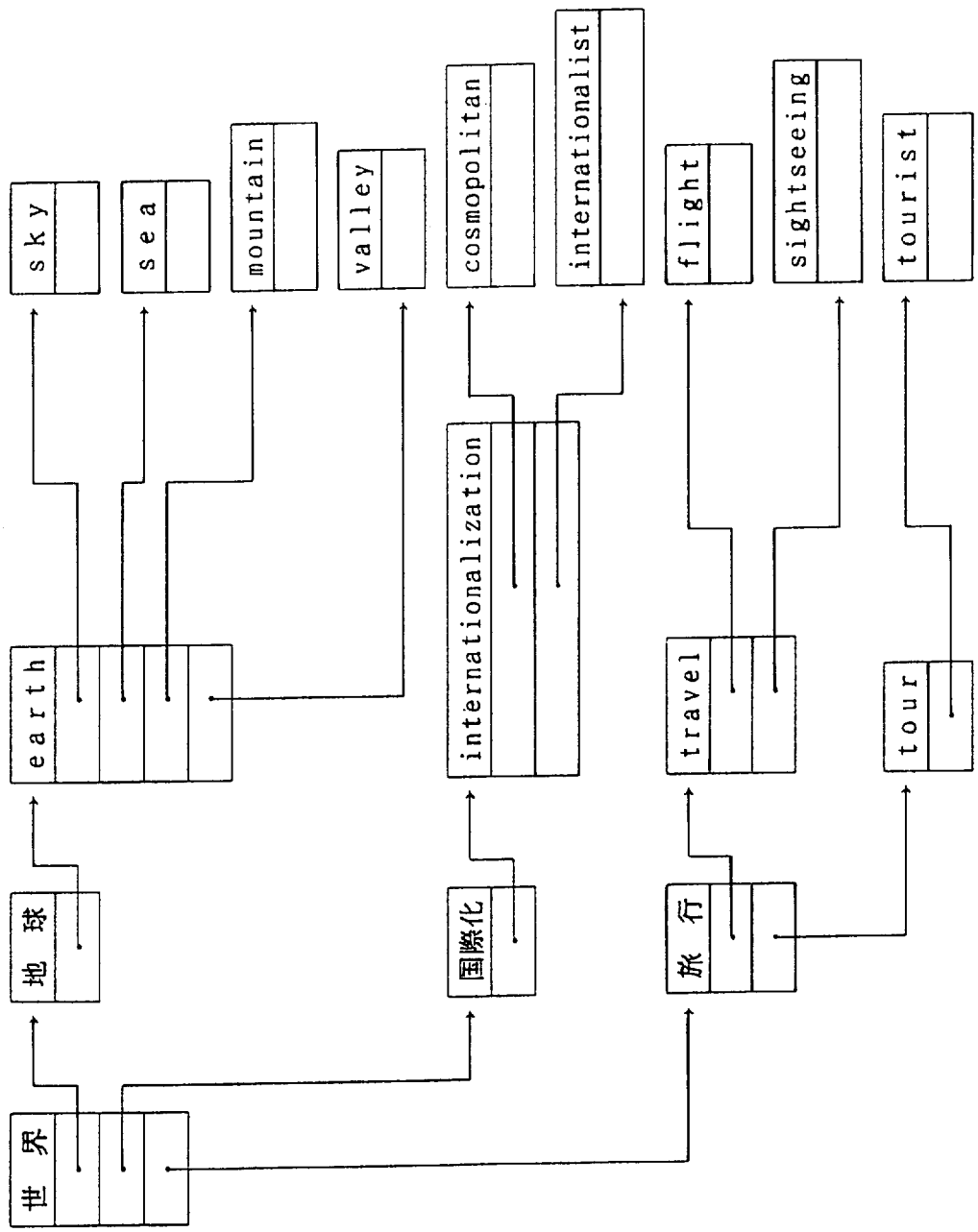
FIG. 10 is a block diagram showing a second expansion history.
Figure 11:
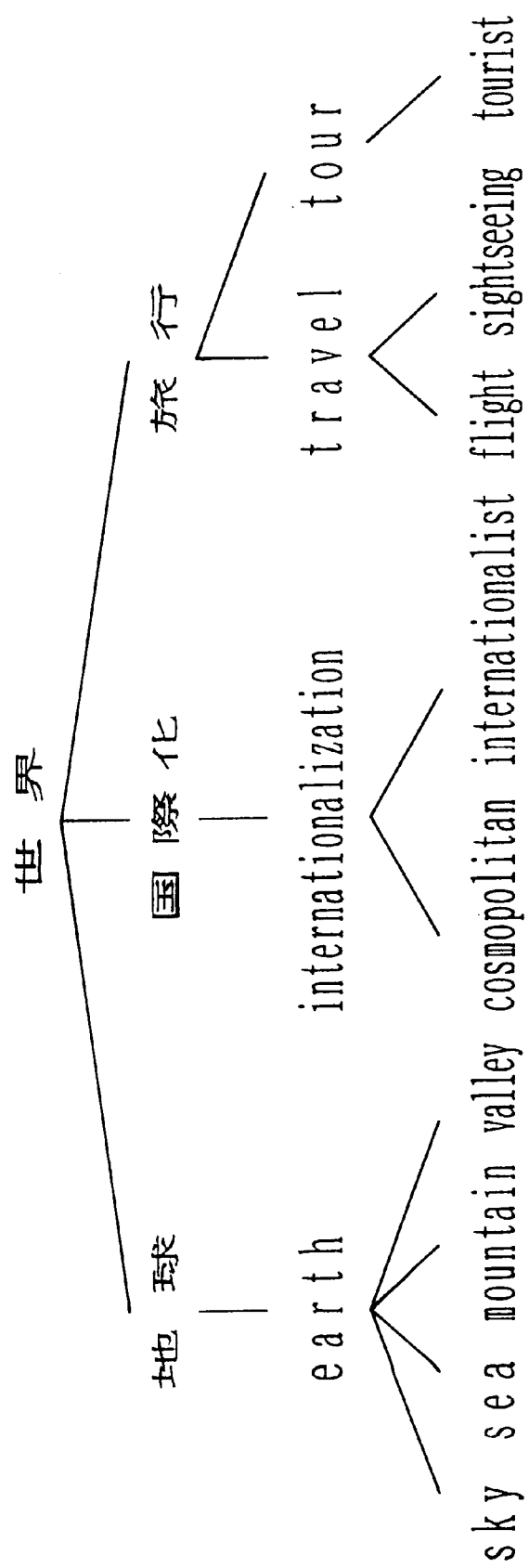
FIG. 11 is a diagram showing a fourth expansion display.

Further, when an English related-term dictionary is looked up, "sky", "sea", "mountain", and "valley" are obtained from "earth", "cosmopolitan" and "internationalist" are obtained from "internationalization", "flight" and "sightseeing" are obtained from "travel", and "tourist" is obtained from "tour". Then, this expansion history is stored in the expansion history memory 18. A tree structure of the thus-stored expansion history is shown in FIG. 10, and this is also displayed in the form of a tree structure in FIG. 11.

By repeating the translation expansion and the related-term expansion processes similarly to the above-mentioned, a displaying processing which includes a plurality of expansion processes can be easily performed. Thus, by simultaneously displaying the information about the expansion processes of the input key-term, a searcher can understand the structure of the expansion history, and can confirm that key-terms for searching to be input to the searching portion 15 is based on his or her intention so that he or she can perform a search.

Assume that a searcher wishes to search for information only about "水泳" and "柔道" on a display screen shown in FIG. 8. When the searcher selects a node "水泳" using a pointing device such as a mouse, a child node of "水泳" is searched in the expansion history memory 18, and "swimming" is obtained. Then, as shown in FIG. 12, the thus-selected "水泳" and its child node "swimming" are displayed emphasized. Next, when the searcher selects "柔道", "柔道" and "judo" are displayed emphasized since its child node is "judo".

When the similar selecting operations are performed by displaying the table shown in FIG. 7 on a display screen, an emphasized display can be obtained as shown in FIG. 13. Here, the control portion 14 supplies only "swimming" and "judo" which are final expanded terms of the selected node, to the searching portion 15. Thus, searching processings regarding the other final expanded terms such as "baseball", "soccer" and the like are omitted, and a search can be performed according to the search key-term intended by the searcher.

When a key-term is expanded to a plurality of levels, there is the case where a node selected by the searcher has not only a tree structure of its child nodes but also a tree structure of its offspring nodes, the number of which is greater than the child nodes, as a lower rank structure. In this case, all the offspring nodes which are derived from the selected parent node including the parent node, are searched to be displayed emphasized. Then, only the terms of the nodes which are displayed emphasized are supplied to the searching portion 15.

By selecting one node from the nodes which are displayed emphasized, the searcher can only display the offspring nodes emphasized again, which are derived from the thus-selected node. Further, the searcher can release the emphasized displays by designating some of the emphasized nodes to be non-selected. The terms of nodes whose emphasized displays have been released, are not supplied to the searching portion 15.

Next, an example of searching an English database according to a Japanese key-term will be explained. Here, a Japanese-English translation dictionary is used for a translation expansion process, and a related-term dictionary as well as an abbreviation dictionary (biographical dictionary) are used for a related-term expansion process. When a searcher inputs "哲学者" as a key-term, "哲学者" is first looked up in the Japanese-English translation dictionary, and "philosopher" is obtained. Next, when "philosopher" is expanded using the related-term dictionary, "Aquinas" and "Hobbs" are obtained as abbreviations of the philosopher's names.

Next, abbreviations which are obtained using the abbreviation dictionary are expanded, and the name (full name) of each philosopher is obtained. Thus, "Aquinas" is expanded into "Thomas Aquinas", and "Hobbs" is expanded into "Thomas Hobbs". This expansion history is stored in the expansion history memory 18 in the form of a tree structure, and this history is displayed to the searcher in the form of a tree structure as shown in FIG. 14.

Figure 14:
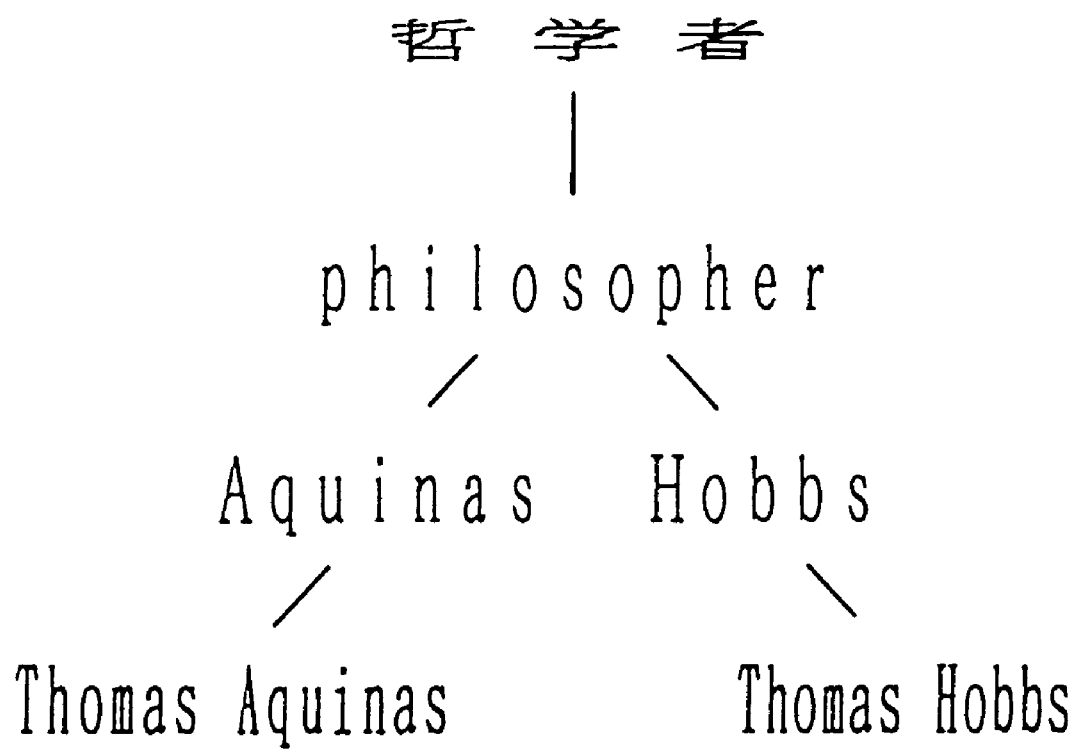
FIG. 14 is a diagram showing a seventh expansion display.
Figure 15:
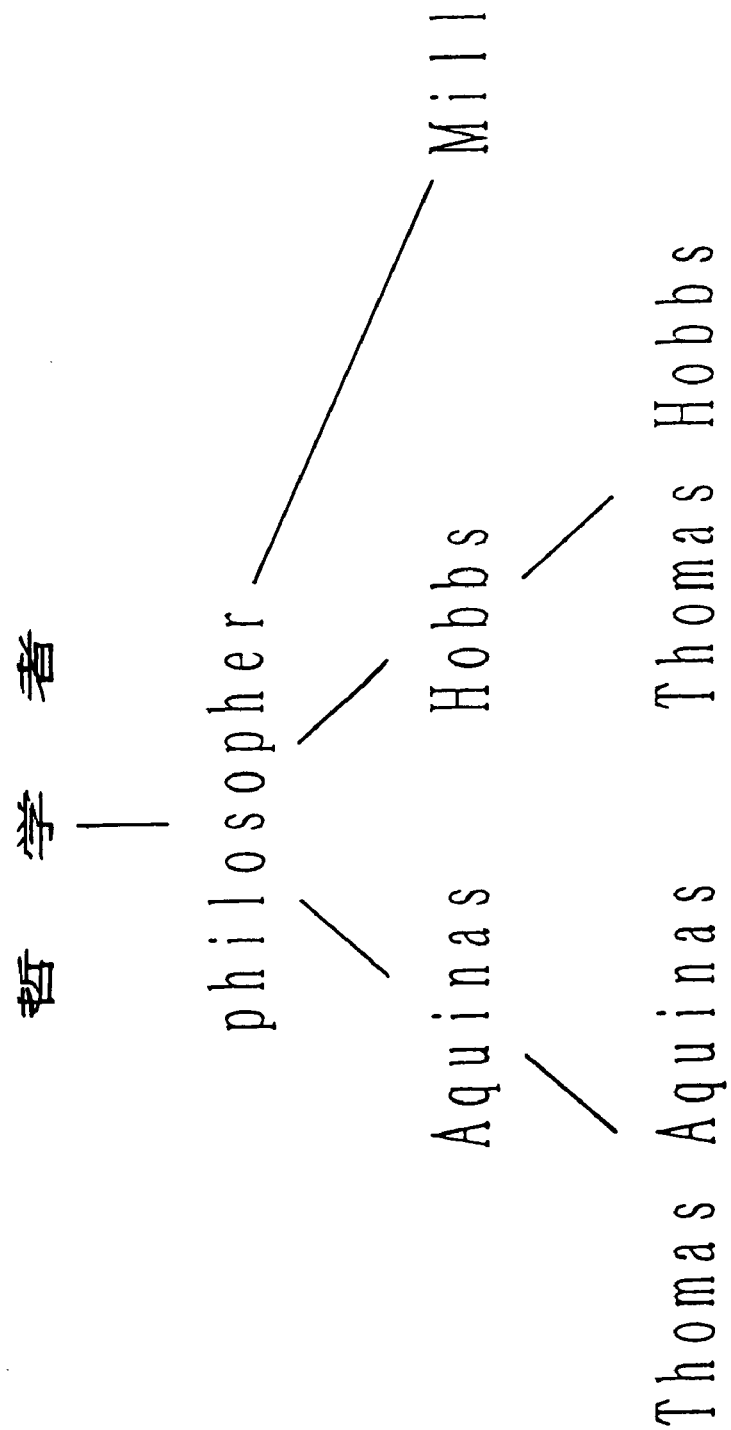
FIG. 15 is a diagram showing an eighth expansion display.

When the searcher wishes to add "Mill" other than "Aquinas" and "Hobbs" as a related term of "philosopher", on the display screen shown in FIG. 14, he or she adds "Mill" as a child node of the node "philosopher", using an adding function of the on-screen information display edit portion 11. At this time, "Mill" is added as a child node of "philosopher", and its tree structure is displayed as shown in FIG. 15.

When the searcher wishes to add "water polo" as a translated term for "水泳", on the display screen shown in FIG. 7, he or she drags the displayed table using a mouse or the like, and expands the table as shown in FIG. 16. Then "water polo" is input to a newly generated cell which corresponds to "水泳". This "water polo" is added to the expansion history memory 18 as a child node of "水泳", and its structure is displayed as shown in FIG. 17.

By using rewriting and deleting functions of the on-screen information display edit portion 11, rewriting and deleting processings for an expansion history can be performed similarly. Here, the expansion process means an operation of rewriting a part of nodes stored in the displayed expansion history into another term. The deleting processing means an operation of deleting a part of the nodes in the displayed expansion history.

Figure 18:
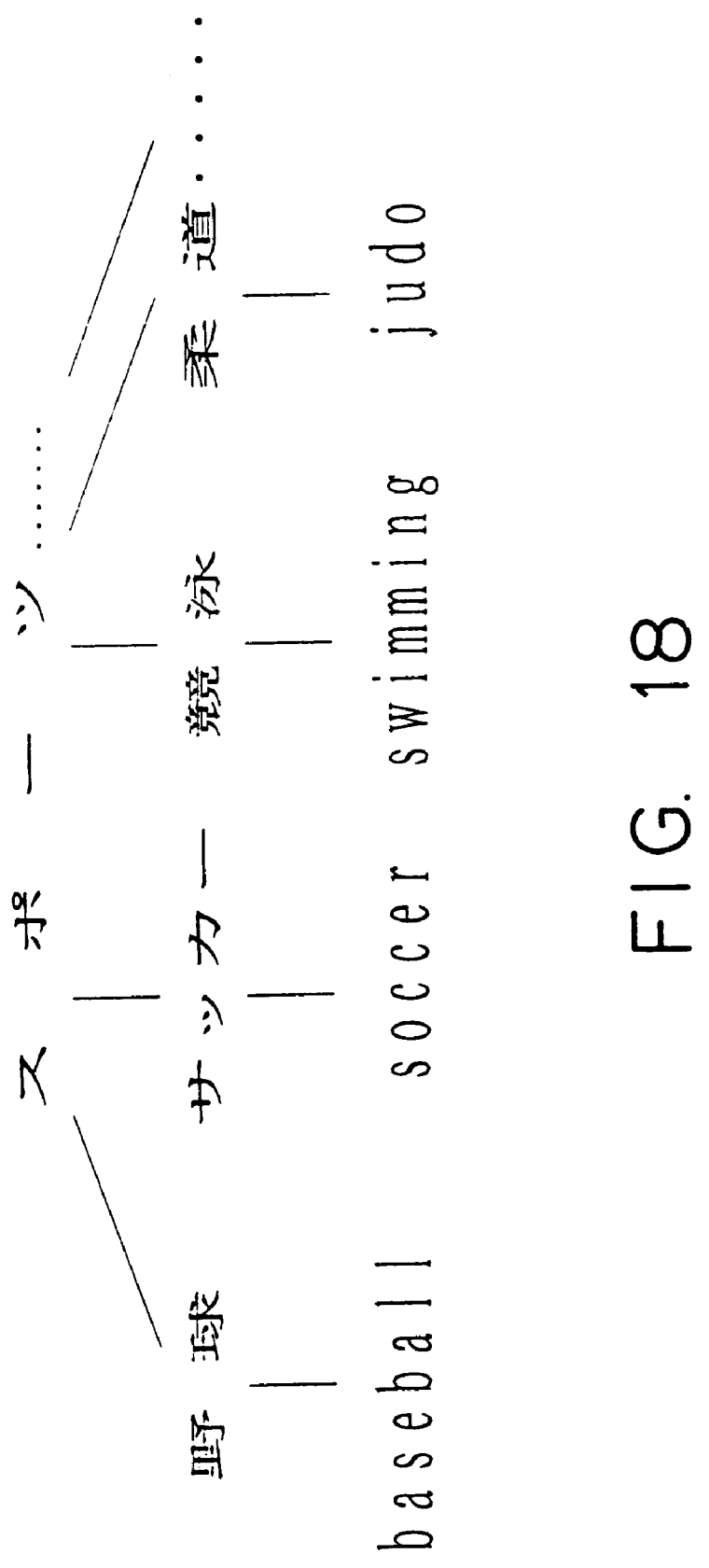

For example, when the searcher uses "競泳" instead of "水泳" as a related term of "スポーツ" on a display screen shown in FIG. 8, a command of rewriting "水泳" into "競泳" is input. As a result, the expansion history is changed to be displayed as shown in FIG. 18. When "水泳" is deleted, "水泳" and its lower rank nodes are all deleted only by inputting a command of deleting "水泳".

By providing such editing functions, a searcher can edit an expansion history and also perform a search based on an expansion process which is not provided with the expansion dictionary. Further, even expansion processes which are provided with the expansion dictionary can be changed or deleted if these processings are not desirable for a search.

Figure 19:
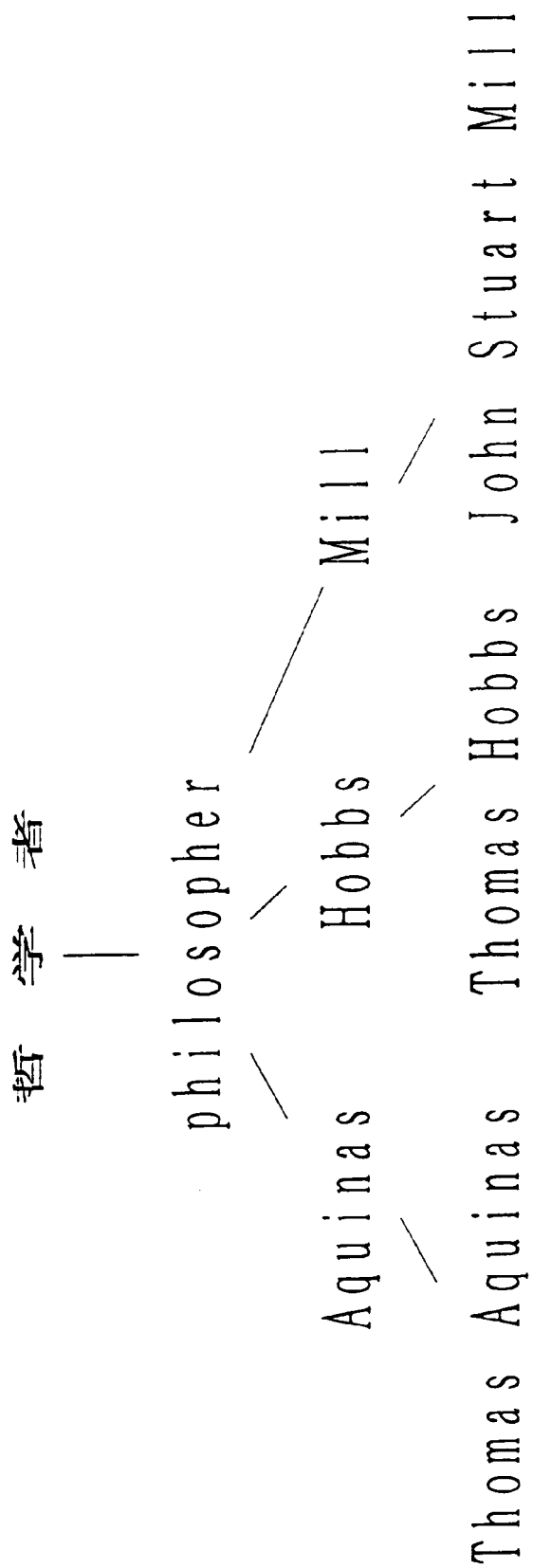
FIG. 19 is a diagram showing a twelfth expansion display.

When an adding operation shown in FIG. 15 is performed, if the thus-added "Mill" is looked up in the abbreviation dictionary, "John Stuart Mill" is obtained as its full name. Then, this full name is stored in the expansion history memory 18, and the structure of the expansion history is automatically calculated again so that a new structure is displayed again as shown in FIG. 19.

Thus, the number of search key-terms which the searcher expects can be automatically increased not only by adding just "Mill" which is added by the searcher to the expansion history and performing a search using this expansion history, but also by further expanding the thus-added "Mill". The searcher can confirm not only that the thus-added "Mill" is displayed on the screen, but also that "Mill" is added to a proper position of the expansion history. In the case of rewriting or deleting of an expansion history, recalculating and re-displaying processings are similarly performed.

When an adding operation is performed as shown in FIG. 15, the control portion 14 adds a registration item (entry) of the related-term dictionary, and reflects the amendments of the expansion history memory 18 on the related-term dictionary. Here, "Mill" is newly added as a related term of "philosopher". In the case of rewriting or deleting an expansion history, an entry of the dictionary is similarly changed, and the thus-edited results are reflected in the dictionary. Thus, it is not necessary to give a command of making the same amendment to the same expansion process whenever the searcher performs a search.

When the structure of the expansion history memory 18 is edited via the on-screen information display edit portion 11, this edit history can be stored. For example, after the expansion history shown in FIG. 14 is edited as shown in FIG. 15, in the case where the searcher instructs the on-screen information display edit portion 11 to cancel this editing, the expansion history memory 18 is re-amended retroactively to the thus-stored edit history. Then, the structure of the original expansion history is restored to be displayed as shown in FIG. 14. Therefore, when the searcher incorrectly performs an editing processing, he or she can cancel this incorrect editing and try to edit the expansion history again.

In the case where a display screen is small, or the searcher wishes to ignore a part of the expansion history, it is better not to display the whole expansion history. In this case, a part (an intermediate level or the like) of the expansion history is omitted so that an abbreviated display where some levels of the tree structure are omitted, is displayed.

Figure 20:
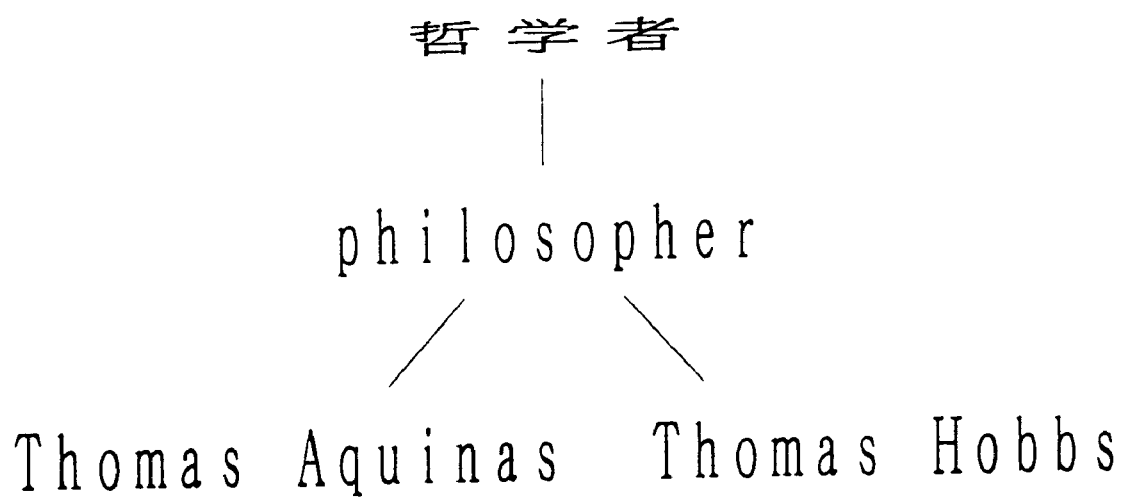
FIG. 20 is a diagram showing a thirteenth expansion display.

For example, assume that when the expansion history has a structure shown in FIG. 14, the searcher instructs only to display a first key-term, that is, "哲学者"; a level indicating the results of a translation expansion process, that is, "philosopher"; and the final level of the expansion process. At this time, the results of the related-term expansion of "philosopher" are omitted, and the expansion history is displayed as shown in FIG. 20. In addition, the thus-abbreviated structure can be displayed as shown in FIG. 21.

Thus, a display region can be saved by omitting levels of a part of the expansion history, and only displaying the history of the remaining levels. Accordingly, in the case where a complicated expansion history is included, this part can be non-displayed.

It is not effective to obtain a final search key-term through expanding in a plurality of levels, when the order of expansion processes and a term to be expanded are predetermined. Therefore, the on-screen information display edit portion 11 registers a simplified expansion history in the dictionary according to the searcher's command.

For example, assume that when the expansion history shown in FIG. 14 is displayed as shown in FIGS. 20 and 21, the searcher instructs to register the displayed expansion history in the dictionary. At this time, "Thomas Aquinas" and "Thomas Hobbs" are directly registered in the related-term dictionary as related terms of "philosopher". Thus, in the subsequent expansion processes, "Thomas Aquinas" and "Thomas Hobbs" can be directly obtained from "philosopher".

Further, the tree structure of the displayed expansion history can be registered as an entry of the dictionary. The following are methods of registering the tree structure in the dictionary:

[term of parent node, child node 1, child node 2, . . . ]

At this time, the lowest rank node is "term", but this is abbreviated to "term". If a structure as shown in FIG. 14 is registered in the dictionary, the subsequent entry is added:

[哲学者, [philosopher, [Aquinas, Thomas Aquinas], [Hobbs, Thomas Hobbs]]]

If a structure as shown in FIG. 20 is registered in the dictionary, the subsequent entry is added:

[哲学者, [philosopher, Thomas Aquinas, Thomas Hobbs]]

Next, a processing when a plurality of key-terms are input, will be explained. In this case, the dictionary looking-up portion 13 repeats the processing of looking up in the expansion dictionary, the same number of times as the number of the given key-terms. The displaying processing shown in step S2 of FIG. 3 is represented by the flowchart shown in FIG. 22.

First, the control portion 14 determines whether or not the given key-term is a first key-term (step S41). If Yes, the displaying processings as shown in FIGS. 4 and 9 are performed (step S42). Next, it is determined whether or not expansion histories are displayed for all the key-terms (step S44), and if any key-term remains not-displayed, the processings in and after step S41 are repeated.

If the given key-term is a second or the subsequent key-term in step S41, its expansion history is displayed hidden behind the expansion history of the first key-term, which is displayed on a screen (step S43), and the processings in and after step S44 are repeated. When the expansion histories of all the key-terms have been displayed, processings are terminated.

In steps S42 and S43, the results of the looking up in the dictionary are displayed for each key-term, in a table. When two Japanese key-term "ソフト" and "選手" are input, a translation expansion process for translating from Japanese to English as well as an English related-term expansion process are performed, and each key-term is converted into an English search key-term, displays as shown in FIGS. 23 and 24 are obtained.

Figure 23:
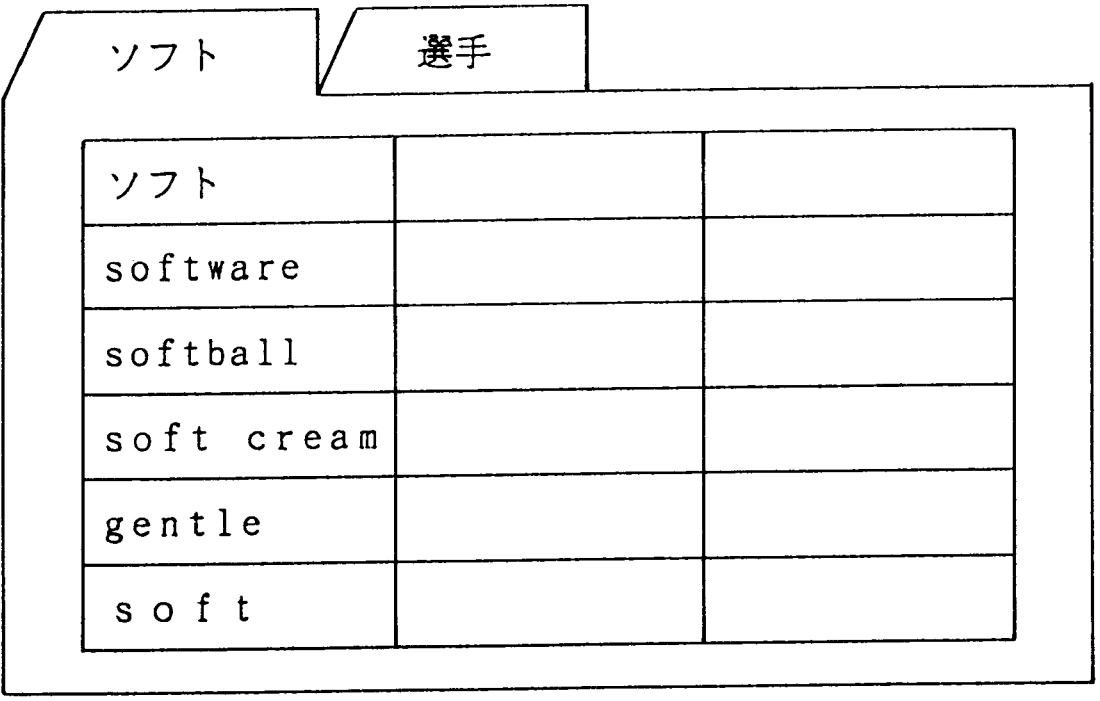
FIG. 23 shows a fifteenth expansion display.

In this case, in order to select a table for each key-term, but not to simultaneously display a plurality of tables on a screen, key-term such as "ソフト" and "選手" are displayed as the title of the table as shown in FIG. 23. Then, the first key-term "ソフト" is looked up in the translation dictionary, and the results are displayed as shown in FIG. 23. In FIG. 23, "software", "softball", "soft cream", "gentle", and "soft" are displayed as the translated terms of "ソフト".

Figure 24:
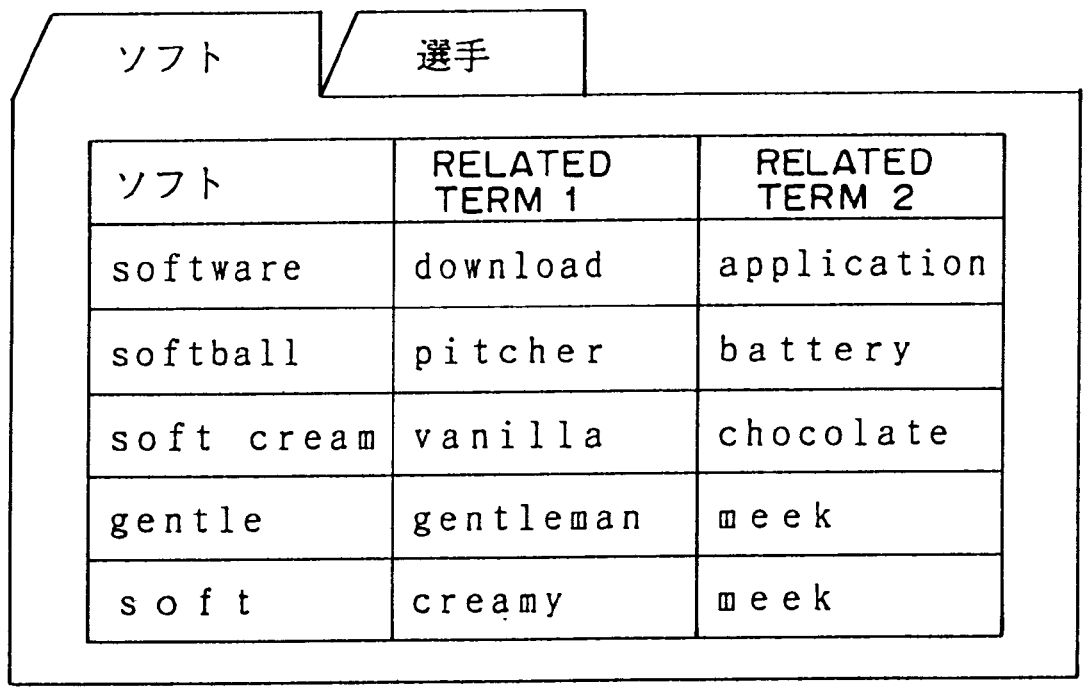
FIG. 24 shows a sixteenth expansion display.

Each of these translated terms is looked up in the related-term dictionary, and the results are shown in FIG. 24. In FIG. 24, "download" and "application" are displayed as the related terms of "software", "pitcher" and "battery" are displayed as the related terms of "softball", "vanilla" and "chocolate" are displayed as the related terms of "soft cream", "gentleman" and "meek" are displayed as the related terms of "gentle", and "creamy" and "meek" are displayed as the related terms of "soft".

Figure 25:
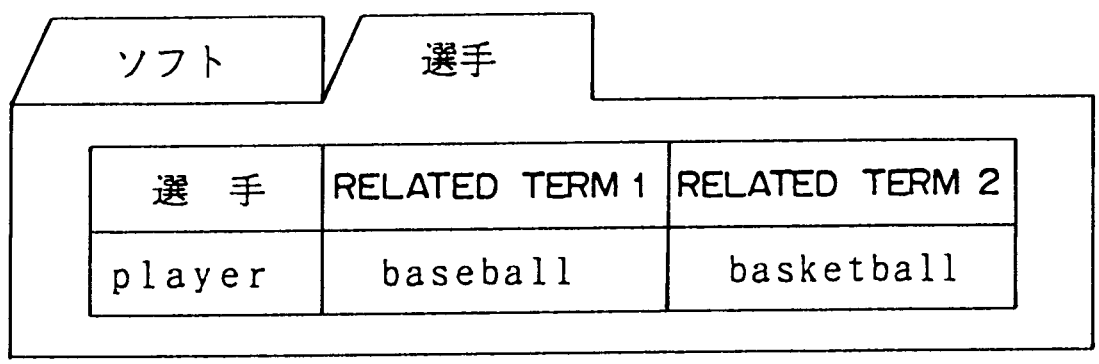
FIG. 25 shows a seventeenth expansion display.

The table of the other key-term "選手" is hidden behind the table of "ソフト", and accordingly this table is not displayed in FIG. 24. Under this condition, when the searcher selects "選手" using a pointing device or the like, the table of "選手" is displayed as shown in FIG. 25. Here, "player" is displayed as the translated term of "選手", and "baseball" and "basketball" are displayed as the related terms of "player". At this time, the table of "ソフト" is hidden behind the table of "選手" so that this table is not-displayed.

Thus, even if a plurality of key-terms are input, the expansion histories are arranged according to the key-term to be structurally displayed to the searcher. At this time, while a table of the first key-term is being displayed and the searcher is looking at this table, the second and the subsequent key-terms are looked up in the dictionary, and the calculations of the tables are performed in the background.

By doing such a control, an expansion history of the first key-term can be promptly displayed without waiting for the termination of the processing of looking up the second and the subsequent key-terms in the dictionary. Further, when the searcher selects the second and the subsequent key-terms, the corresponding tables can be immediately displayed.

When a plurality of key-terms are input, the tree structures of expansion histories are restricted using the co-occurrence information of the key-term or the expanded terms, and the thus-restricted expansion histories can be stored in the expansion history memory 18.

In the above-mentioned example, the information searching apparatus searches a co-occurrence information database for the translated terms of "ソフト" and "選手", after "ソフト" and "選手" are translated. Then, it automatically selects only the co-occurring terms, and stores them in the expansion history memory 18. For example, the co-occurrence information database is included in the database 19 shown in FIG. 2, and is searched by the searching portion 15. A fact that information A and information B co-occur means that the information B is registered as related information of the information A, while the information A is registered as related information of the information B.

In FIG. 24, "software", "softball", "soft cream", "gentle", and "soft" are obtained as translated terms for "ソフト". In FIG. 25, "player" is obtained as a translated term for "選手". The co-occurrence information database of these translated terms is, for example, as shown in FIG. 26. When the co-occurrence information database is searched, it can be understood that "player" is registered as related information of "softball", and "softball" is registered as related information of "player". Therefore, "softball" and "player" co-occur.

Figure 27:
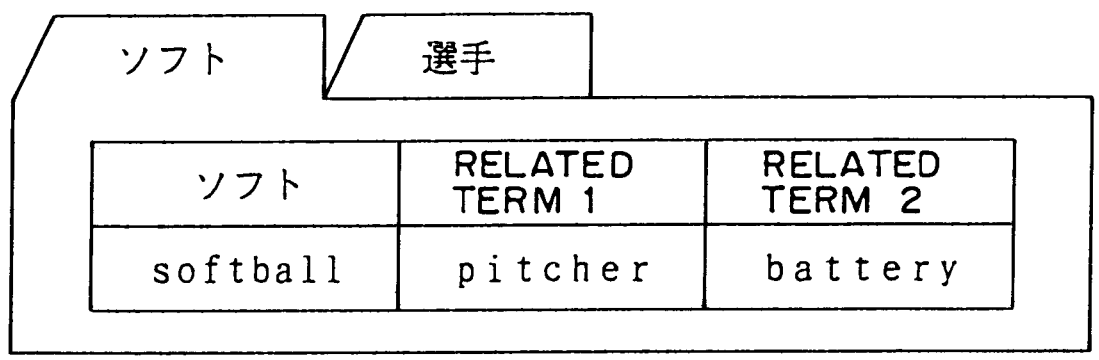
FIG. 27 shows an eighteenth expansion display.

If there is no other set of co-occurring terms, the control portion 14 only stores "softball" as a child node of "ソフト", and "player" as that of "選手", in the expansion history memory 18. The thus-stored expansion history is displayed as shown in FIG. 27. According to this storing method, since key-terms for searching are automatically selected from an expansion history, it is not necessary for the searcher to select key-terms for searching so that an effective search is performed.

The following is one example of a preparing method of a co-occurrence information database. When a document is given, a relation ratio between a term A and a term B is defined by the following equation.

Relation ratio=log (simultaneous occurrence probability of term A and term B/occurrence probability of term A×occurrence probability of term B).

The occurrence probability of the term A (B) is obtained by dividing the number of the terms A (B) included in the whole document by the number of all the terms included in this document. The simultaneous occurrence probability of the terms A and B is a probability of simultaneous occurrence of the terms A and B in a certain part of the document (for example, in a part composed of equal to or less than 50 terms).

After each relation ratio is calculated for respective terms included in the document, the other terms which have relation ratios greater than a predetermined value to a certain term, are listed in the order of higher relation ratios, and are stored in a co-occurrence information database. For example, terms B and C related to the term A are registered as follows:

term A: term B, term C, . . .

Figure 28:
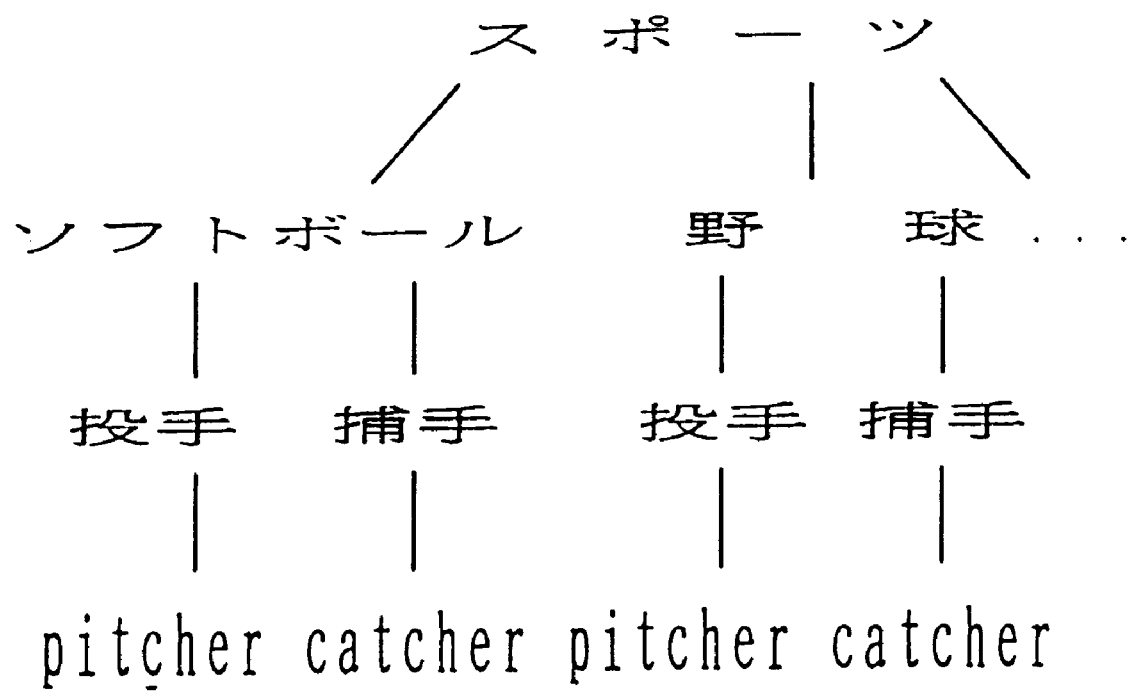
FIG. 28 is a diagram showing a third expansion history.

Next, another displaying method of an expansion history will be explained. For example, it is assumed that a key-term "スポーツ" is input, a translation expansion process is performed after its related-term expansion process is performed in two levels, and an expansion history is obtained as shown in FIG. 28. In FIG. 28, "投手" and "捕手" are obtained as related terms of the terms "ソフトボール" and "野球" related to "スポーツ", respectively. The translated terms of these related terms are the same.

Figure 29:
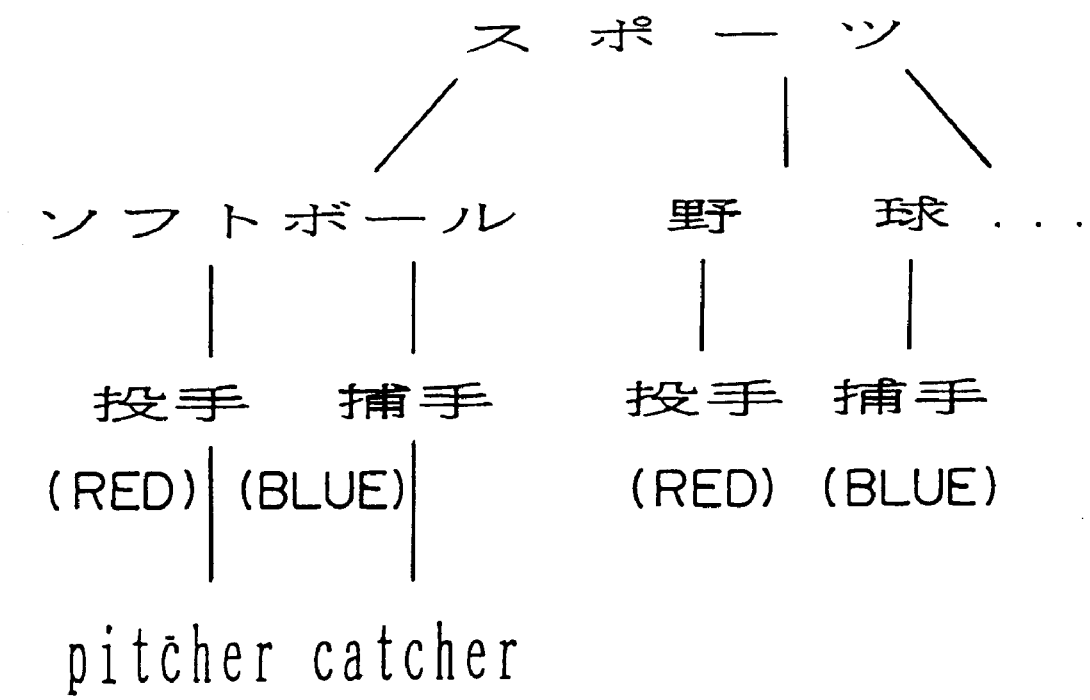
FIG. 29 is a diagram showing a nineteenth expansion display.
Figure 30:
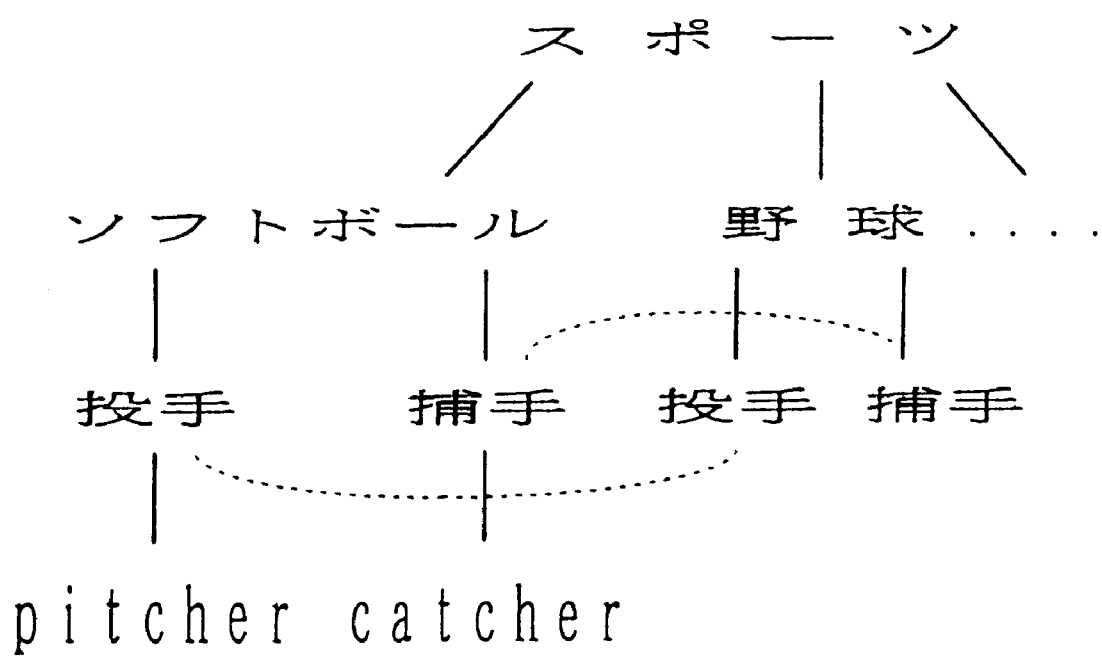
FIG. 30 is a diagram showing a twentieth expansion display.
Figure 31:
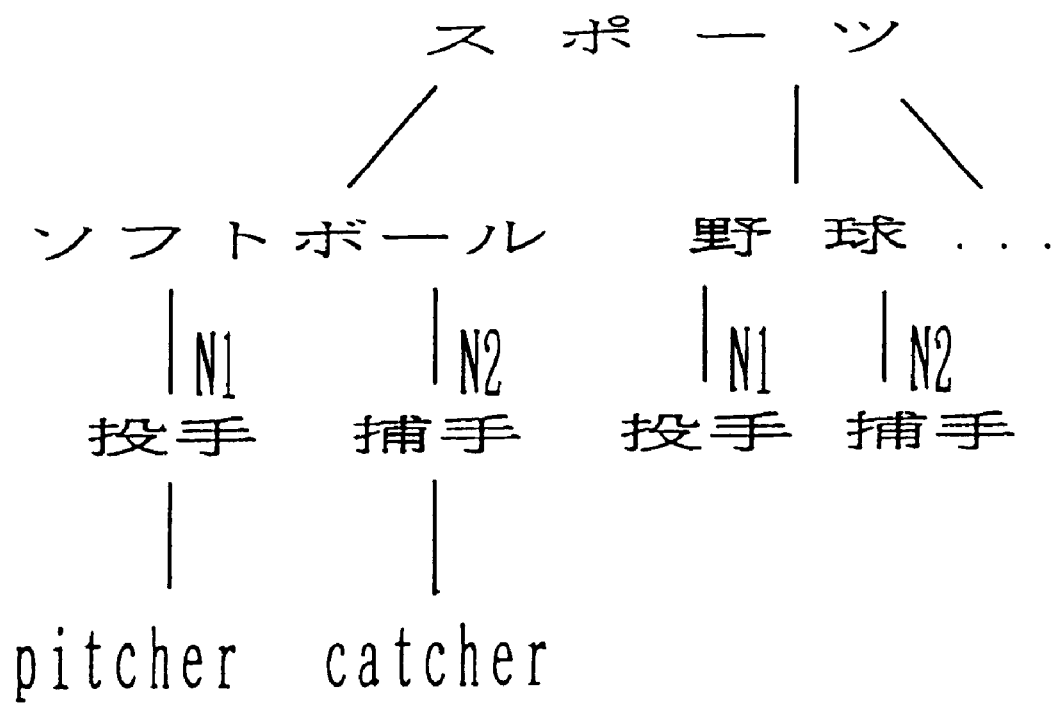
FIG. 31 is a diagram showing a twenty-first expansion display.

If the expansion history is displayed as it is, although "ソフトボール" and "野球" are expanded in the same way, the results are separately displayed so that the display is not clear. Therefore, a plurality of terms which are expanded in the same way, are displayed in the same color as shown in FIG. 29, or they are displayed connected with a dotted line or the like as shown in FIG. 30, or they are displayed by indicating the nodes using the same name as shown in FIG. 31. In order to prevent duplication in the expansion history of the subsequent terms, the history is displayed only for one node of them.

By displaying the same expanded terms visually related, it is possible to inform the searcher that the visually related terms are the same. The searcher can confirm the subsequent expansion history with reference to the visually related terms. Further, the duplicated expansion histories are displayed together so that the screen is clear and easily be viewed.

When the first expansion result is displayed for the input key-term, the searcher can select at least one rewritten term in the result, and the next expansion process is performed only for the thus-selected expanded term.

Figure 32:
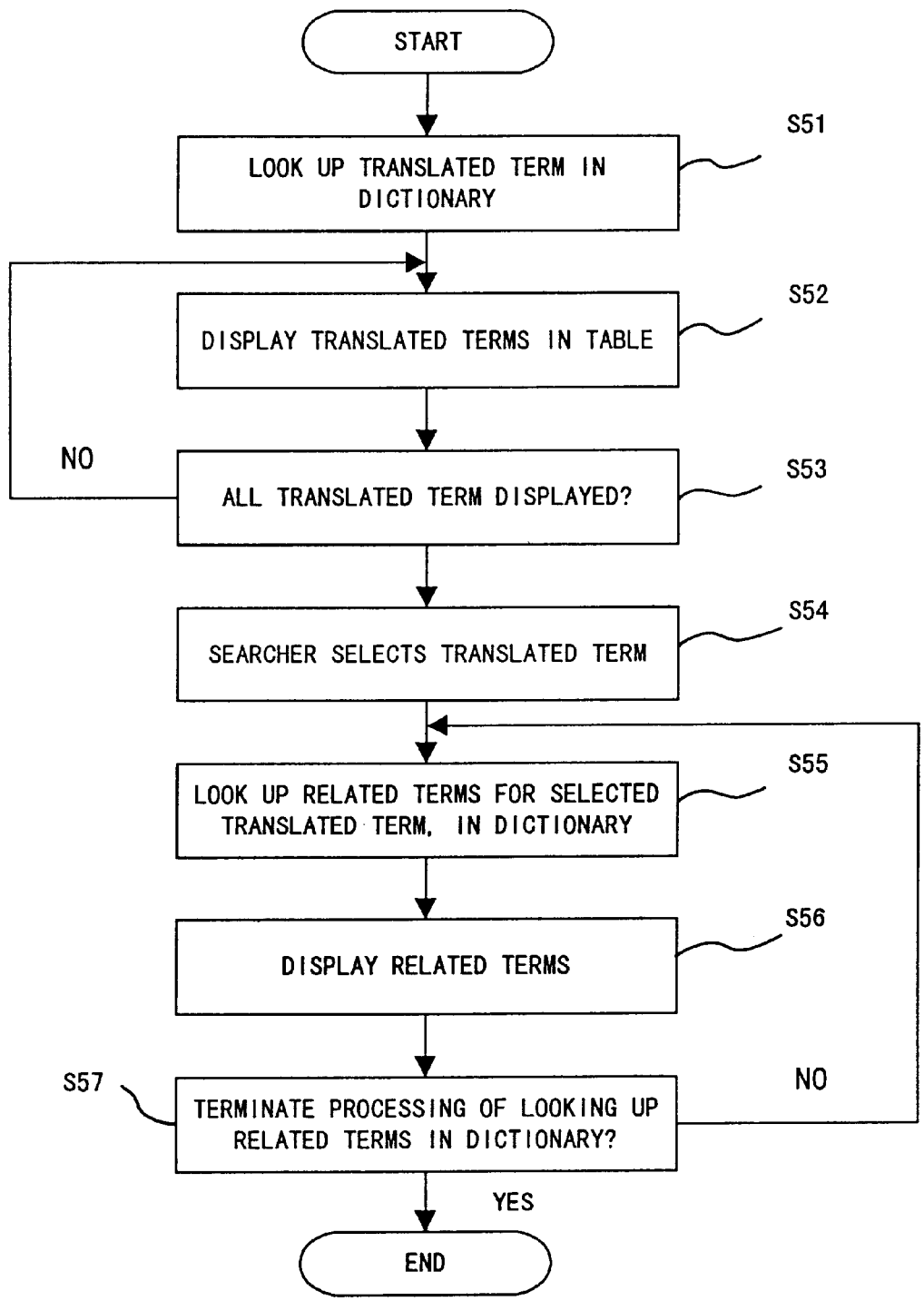
FIG. 32 is a flowchart showing a fourth displaying processing.

FIG. 32 is a flowchart of such a displaying processing. First, the dictionary looking-up portion 13 looks up the translated term of a key-term in the translation dictionary (step S51), and the on-screen information display edit portion 11 displays the result in the form of a table (step S52). The control portion 14 determines whether or not all the translated terms are displayed (step S53). If any translated term remains not-displayed, the processing in step S52 is repeated. After all the translated terms are displayed, the searcher's command is waited for.

When the searcher selects some of the displayed translated terms (step S54), the dictionary looking-up portion 13 looks up related terms of the thus-selected terms, in the related-term dictionary (step S55), and the on-screen information display edit portion 11 displays the related terms (step S56). The control portion 14 determines whether or not all the selected terms are looked up in the dictionary (step S57), and if any term remains not-looked up, processings in and after step S55 are repeated. When the processing of looking up in the related-term dictionary is terminated, all the processings are terminated.

For example, when a key-term "ソフト" is input, a table such as FIG. 33 is displayed in step S52. Next, in step S54, the searcher selects the translated terms "softball" and "soft" as shown in FIG. 34. When the selecting operation is terminated, and the searcher selects an expansion button displayed on a screen, related terms of the selected terms are looked up in the dictionary, and the thus-obtained related terms are displayed on the screen as shown in FIGS. 35 and 36. Thus, by expanding/displaying only the terms designated by the searcher, unnecessary expansion processes are removed so that processings can be performed at high speed.

Next, a displaying method of a compound term in the case where a key-term is composed of a plurality of morphemes or terms (hereinafter, both are referred to as morphemes) will be explained.

FIG. 37 is a flowchart of such a displaying processing. The on-screen information display edit portion 11 displays possible combinations of morpheme divisions in the form of a table (step S61). When the searcher selects a certain combination among them (step S62), the information searching apparatus performs a translation expansion or a related-term expansion for each of the morphemes obtained by this division, and stores the expansion history in the expansion history memory 18, so that a part or the whole of the expansion history is displayed on a screen (step S63).

Figure 38:
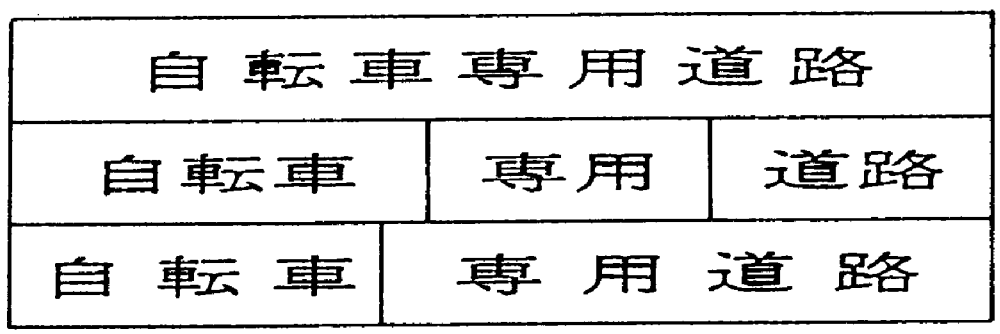
FIG. 38 shows a first dividing display of a key-term.

For example, when a compound term "自転車専用道路" is input as a key-term, combinations of morpheme division are displayed as shown in FIG. 38. Here, three combinations of the divided morphemes such as "自転車専用道路", "自転車"-"専用"-"道路", and "自転車"-"専用道路" are displayed.

Figure 22:
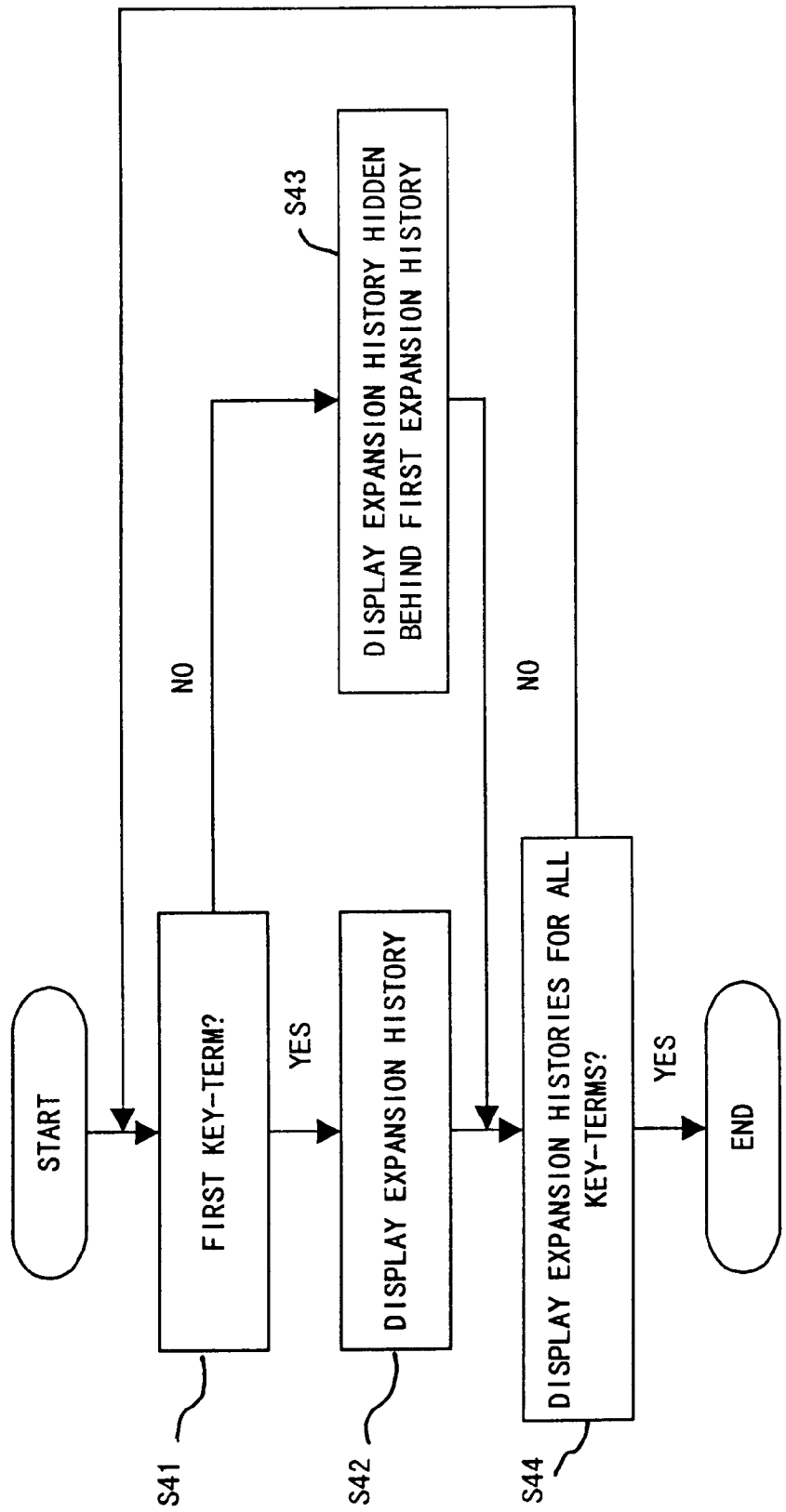
FIG. 22 is a flowchart showing a third displaying processing.

When the searcher selects a combination of "自転車"-"専用"-"道路", each morpheme is separately expanded according to a displaying processing as shown in FIG. 22, and a table such as FIG. 39 is displayed. When the searcher selects the key-term "自転車専用道路" itself, a table as shown in FIG. 40 is displayed. By designating a dividing method of the key-term by the searcher, the searcher's intention can be reflected on the search key-term.

According to the dividing method of a key-term, however, there might arise the case where morphemes which are not included in the dictionary are included in a combination. When combinations of morpheme divisions are displayed, morphemes which are included in each combination are looked up in the dictionary, it is determined whether or not expanded terms are present, and the combinations are displayed in the order of combinations having the greater number of expanded terms.

FIG. 41 is a flowchart of such a displaying processing. The dictionary looking-up portion 13 first looks up each morpheme included in a combination of morphemes, in the translation dictionary (step S71). Next, the on-screen information display edit portion 11 displays the combinations of morphemes in the order of combinations having the greater number of the morphemes which have been looked up in the dictionary, in the form of a table (step S72).

When the searcher selects a certain combination among the displayed combinations (step S73), the on-screen information display edit portion 11 displays corresponding translated terms (step S74). Next, the dictionary looking-up portion 13 looks up the related terms of each translated term in the related-term dictionary (step S75), the on-screen information display edit portion 11 displays the related terms (step S76). The control portion 14 determines whether or not all the translated terms have been looked up in the dictionary (step S77). If any term remains not-looked up in the dictionary, the processings in and after step S75 are repeated. When the processing of looking up in the related-term dictionary is terminated, all the processings are terminated.

In the above-mentioned example, "自転車専用道路", "自転車", "専用", "道路", and "専用道路" are respectively looked up in the translation dictionary. It is assumed that "自転車専用道路", "自転車", "専用", and "道路" are registered in the translation dictionary, and "専用道路" is not registered in the translation dictionary.

At this time, the ratio of morphemes obtained by looking up "自転車専用道路" and "自転車"-"専用"-"道路" in the dictionary is 100%, while the ratio of morphemes obtained by looking up "自転車"-"専用道路" in the dictionary is 50%. Therefore, the combination of "自転車"-"専用道路" is displayed last as shown in FIG. 38.

When the searcher selects "自転車"-"専用"-"道路" among these combinations, the translated terms are displayed since the processing of looking up in the translation dictionary has been already terminated. For each of the translated terms, its related terms are looked up in the related-term dictionary. The results are shown in FIG. 39.

In such a displaying method, the searcher can designate a dividing method according to the ratios of morphemes registered in the dictionary. Further, if the ratios of morphemes obtained by looking up in the dictionary are displayed for each combination of morphemes, the displayed combinations can be quantitatively compared.

Figure 42:
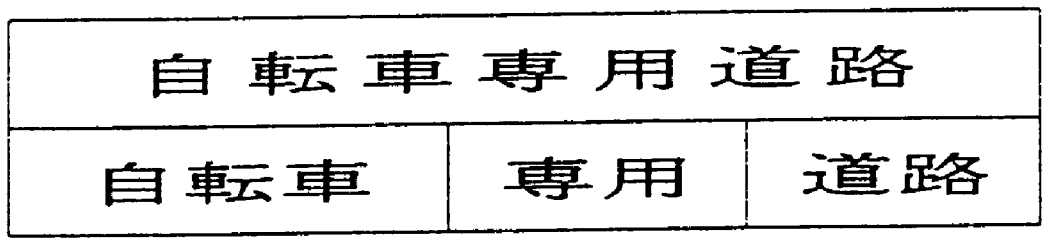
FIG. 42 shows a second dividing display of the key-term.

When possible combinations of morphemes are displayed, only the combinations whose morphemes have been all registered in the dictionary can be displayed. For example, in the above-mentioned example, if "専用道路" is not registered in the translation dictionary, a combination of morphemes such as "自転車"-"専用道路" is not displayed as shown in FIG. 42. By doing so, a problem such that "専用道路" is not expanded since the searcher selects "自転車"-"専用道路" can be removed.

The information searching apparatus shown in FIG. 2 is configured using an information processing apparatus (computer), for example, as shown in FIG. 43. The information processing apparatus shown in FIG. 43 comprises a CPU (central processing unit) 21, a memory 22, an inputting apparatus 23, an outputting apparatus 24, an external storage apparatus 25, a medium driving apparatus 26, and a network connecting apparatus 27, and these apparatuses are connected to each other via a bus 28.

The memory 22 includes, for example, a ROM (read only memory) and a RAM (random access memory), and it stores programs and data to be used for processings. The CPU 21 performs necessary processings by executing the programs via the memory 22. This memory 22 can be used for the expansion history memory 18.

The inputting apparatus 23 is, for example, a keyboard, a pointing device, a touch panel or the like, and this apparatus can be used for the input of the commands or the information from the searcher. The outputting apparatus 24 is, for example, a display, a printer, or the like, and this apparatus is used for the output of the questions to the searcher, an expansion history, searched results or the like.

The external storage apparatus 25 is, for example, a magnetic disk apparatus, an optical disk apparatus, or a magneto-optical disk apparatus. The above-mentioned programs and data can be stored in this external storing apparatus 25, and then they can be used after loading to the memory 22, if necessary. Further, the external storage apparatus 25 stores expansion dictionaries 16 and 17, or provides the database 19.

The medium driving apparatus 26 drives a portable storage medium 29, thereby accessing the contents stored in the medium 29. As the portable storage medium 29, an arbitrary computer readable storage medium, such as a memory card, a floppy disk, CD-ROM (compact disk read only memory), an optical disk, a magneto-optical disk or the like is used. The above-mentioned programs and data are stored in this portable storage medium 29, and then they can be used after loading to the memory 22, if necessary.

The network connecting apparatus 27 communicates with external apparatuses via an arbitrary network (line) such as a LAN (local area network) or the like, and performs a data conversion which is required for these communications. If necessary, the above-mentioned programs and data are received from the external apparatuses to be used after loading to the memory 22.

Figure 44:
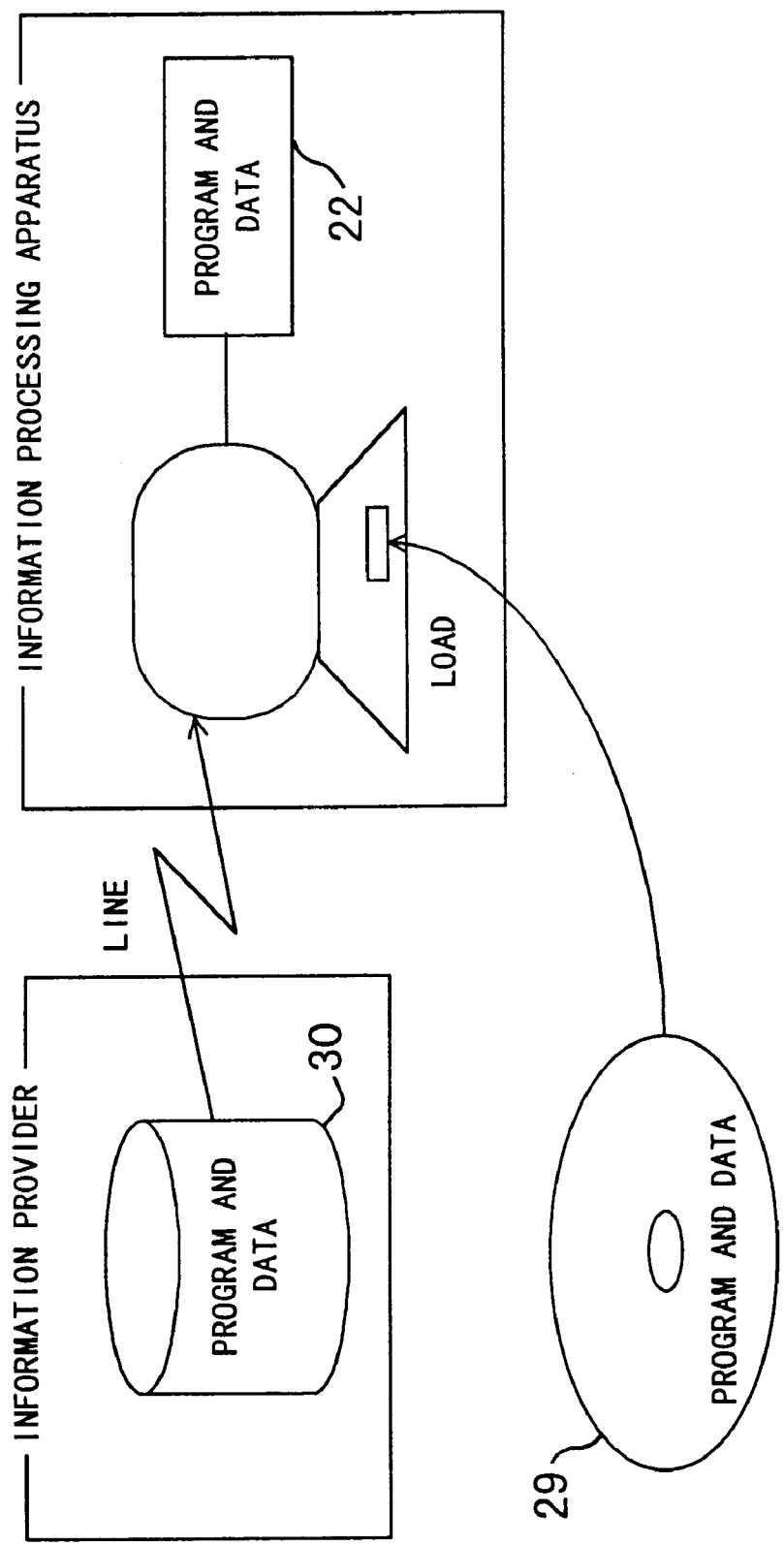
FIG. 44 is a schematic diagram showing storage media.

FIG. 44 shows computer readable storage media to enable the supplying of programs and data to the information processing apparatus shown in FIG. 43. The programs and data stored in the portable storage medium 29 or the external database 30 are loaded to the memory 22. Then, the CPU 21 executes the programs using these data, and performs the necessary processings.

Differently from a conventional cross-lingual information retrieval, the present invention stores the expansion history of a key-term having a plurality of levels, and accordingly can interactively and clearly display the necessary information stored in these levels to a searcher. Thus, the key-term navigation intended by the searcher can be effectively realized.

What is claimed is:

1. An information searching apparatus comprising:

an inputting device inputting a key-term;

an expanding device iteratively expanding the input key-term to a plurality of levels of information;

a storing device storing a history of expansions in a form of a tree structure including nodes corresponding to pieces of information at each level;

an outputting device outputting information of at least a part of the tree structure; and a searching device performing a search, using the output information.

2. The information searching apparatus according to claim 1, wherein the expanding device includes a translation dictionary device translating a term from one language to another language, and a related-term dictionary device obtaining a related term in a same language, and expands the key-term to a plurality of levels by combining a translation expansion process and a related-term expansion process.

3. The information searching apparatus according to claim 1, further comprising a commanding device inputting a command from a user, wherein when the user selects a specific node of the history of the tree structure, the outputting device displays the specific node and a node derived from the specific node emphasized.

4. The information searching apparatus according to claim 3, wherein when the user designates one of the nodes displayed emphasized not to be selected, the outputting device releases an emphasized display of at least the designated node.

5. The information searching apparatus according to claim 1, further comprising an editing device performing at least one of rewriting the output information, adding a node, and deleting a node, according to a user's command.

6. The information searching apparatus according to claim 5, wherein the editing device recalculates a tree structure from the tree structure stored in the storing device according to the user's command, and the outputting device outputs the recalculated tree structure.

7. The information searching apparatus according to claim 5, wherein the expanding device includes a dictionary device converting a given term into another term, and the editing device reflects a result of an editing processing on an entry of a dictionary in the dictionary device.

8. The information searching apparatus according to claim 5, wherein the editing device cancels an editing processing according to the user's command.

9. The information searching apparatus according to claim 1, wherein the outputting omits a part of the history of the expansions stored in the storing device, and outputs information having at least one arbitrary level.

10. The information searching apparatus according to claim 9, wherein the expanding device includes a dictionary device converting a given term into another term, and a registering device registering a structure after the part of the history is omitted, in the dictionary device.

11. The information searching apparatus according to claim 1, wherein the inputting device inputs more than one of key-terms, and the outputting device displays an expansion history for each key-term, on a screen.

12. The information searching apparatus according to claim 11, wherein while an expansion history of one of the key-terms is being displayed, the expanding device calculates an expansion history of other key-terms.

13. The information searching apparatus according to claim 1, wherein the inputting device inputs more than one key-terms, and the expanding device restricts a tree structure of the history according to co-occurrence information among the key terms.

14. The information searching apparatus according to claim 1, wherein when at least two identical terms are included in the output information, the outputting device outputs the at least two identical terms as being related to each other.

15. The information searching apparatus according to claim 1, further comprising a commanding device inputting a user's command, wherein when at least one term is selected in the history of the expansions of the key-term, the expanding device performs a next expansion process for the selected term, and the outputting device outputs a result of the next expansion process.

16. The information searching apparatus according to claim 1, further comprising a commanding device inputting a user's command, wherein the inputting device inputs a compound key-term composed of more than one morphemes, the outputting device outputs at least one combination of morphemes obtained by dividing the compound key-term, when one combination is selected, the expanding device performs an expansion process for each morpheme included in the selected combination, and the outputting device outputs an expansion history of each morpheme.

17. The information searching apparatus according to claim 16, wherein the outputting device outputs combinations of morphemes in an order of combinations having a greater number of morphemes which can be expanded.

18. The information searching apparatus according to claim 16, wherein the outputting device only outputs a combination of morphemes which can all be expanded.

19. A computer readable storage medium storing a program to be executed by a computer, the program enabling the computer to perform:

inputting a key-term;

iteratively expanding the key-term to a plurality of levels of information;

storing a history of expansions in a form of a tree structure including nodes corresponding to pieces of information at each level; and outputting information of at least one part of the tree structure.

20. An information searching method comprising:

inputting a key-term;

iteratively expanding the key-term to a plurality of levels of information;

storing a history of expansions in a form of a tree structure;

displaying information of at least one part of the tree structure including nodes corresponding to pieces of information at each level; and performing a search using the displayed information.

* * * * *